United States Patent
Schilling

(10) Patent No.: US 6,873,643 B2
(45) Date of Patent: *Mar. 29, 2005

(54) SPREAD SPECTRUM ADAPTIVE POWER CONTROL COMMUNICATIONS SYSTEM AND METHOD

(75) Inventor: Donald L. Schilling, Sands Point, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 728 days.

This patent is subject to a terminal disclaimer.

(21) Appl. No.: 09/843,520

(22) Filed: Apr. 27, 2001

(65) Prior Publication Data

US 2002/0012382 A1 Jan. 31, 2002

(Under 37 CFR 1.47)

Related U.S. Application Data

(63) Continuation-in-part of application No. 09/167,388, filed on Oct. 6, 1998, now Pat. No. 6,226,316, which is a continuation of application No. 08/666,069, filed on Jun. 21, 1996, now abandoned, which is a continuation of application No. 08/218,198, filed on Mar. 28, 1994, now Pat. No. 5,535,238, which is a continuation-in-part of application No. 07/792,869, filed on Nov. 19, 1991, now Pat. No. 5,299,226, which is a continuation-in-part of application No. 07/614,816, filed on Nov. 16, 1990, now Pat. No. 5,093,840.

(51) Int. Cl.[7] .............................................. H04B 1/69
(52) U.S. Cl. ...................... 375/130; 375/141; 455/522
(58) Field of Search ................................ 375/130, 142, 375/138, 141, 146; 455/13.4, 522

(56) References Cited

U.S. PATENT DOCUMENTS

| 3,831,013 A | 8/1974 | Alsup et al. |
| 3,838,342 A | 9/1974 | Bjorkman |
| 3,900,721 A | 8/1975 | Speiser et al. |

(Continued)

FOREIGN PATENT DOCUMENTS

| EP | 0265178 | 4/1988 |
| EP | 0392079 | 10/1990 |
| EP | 0392079 A2 | 10/1990 |
| GB | 2229609 | 9/1990 |
| WO | 8600486 | 1/1986 |
| WO | WO 86/00486 | 1/1991 |
| WO | WO 91/07037 | 5/1991 |
| WO | 9107037 | 5/1991 |
| WO | WO 91/15071 | 10/1991 |
| WO | 9115071 | 10/1991 |

OTHER PUBLICATIONS

Fluhr, Z.C. and Porter, P.T., "Advanced Mobile Phone Service: Control Architecture", The Bell system Technical Journal (Jan. 1979), vol. 58, No. 1, pp. 43–69.

(Continued)

*Primary Examiner*—Temesghen Ghebretinsae
(74) *Attorney, Agent, or Firm*—Volpe and Koenig, P.C.

(57) ABSTRACT

A spread spectrum communication system has a mobile station and a base station. The base station transmits a spread spectrum signal and a threshold. The mobile station receives the spread spectrum signal and the threshold. A received power level of the received spread spectrum signal is measured. The received power lever is compared to the threshold. The mobile station's transmission level is adjusted based on in part a result of the comparison.

20 Claims, 14 Drawing Sheets

U.S. PATENT DOCUMENTS

| | | |
|---|---|---|
| 4,112,372 A | 9/1978 | Holmes et al. |
| 4,189,677 A | 2/1980 | Cooper et al. |
| 4,193,031 A | 3/1980 | Cooper |
| 4,222,115 A | 9/1980 | Cooper et al. |
| 4,238,850 A | 12/1980 | Vance |
| 4,247,942 A | 1/1981 | Hauer |
| 4,285,060 A | 8/1981 | Cobb et al. |
| 4,392,232 A | 7/1983 | Andren et al. |
| 4,418,393 A | 11/1983 | Zscheile, Jr. |
| 4,418,425 A | 11/1983 | Fennel, Jr. et al. |
| 4,425,642 A | 1/1984 | Moses et al. |
| 4,455,651 A | 6/1984 | Baran |
| 4,479,226 A | 10/1984 | Prabhu et al. |
| 4,484,335 A | 11/1984 | Mosley et al. |
| 4,512,013 A | 4/1985 | Nash et al. |
| 4,523,311 A | 6/1985 | Lee et al. |
| 4,538,280 A | 8/1985 | Mosley, Jr. et al. |
| 4,553,130 A | 11/1985 | Kato |
| 4,563,774 A | 1/1986 | Gloge |
| 4,606,039 A | 8/1986 | Nicolas et al. |
| 4,612,637 A | 9/1986 | Davis et al. |
| 4,621,365 A | 11/1986 | Chiu |
| 4,639,914 A | 1/1987 | Winters |
| 4,641,322 A | 2/1987 | Hasegawa |
| 4,647,863 A | 3/1987 | Skudera, Jr. et al. |
| 4,649,549 A | 3/1987 | Halpern et al. |
| 4,653,069 A | 3/1987 | Roeder |
| 4,660,164 A | 4/1987 | Leibowitz |
| 4,672,605 A | 6/1987 | Hustig et al. |
| 4,672,629 A | 6/1987 | Beier |
| 4,672,658 A | 6/1987 | Kavehrad et al. |
| 4,675,839 A | 6/1987 | Kerr |
| 4,680,785 A | 7/1987 | Akiyama et al. |
| 4,691,326 A | 9/1987 | Tsuchiya |
| 4,697,260 A | 9/1987 | Grauel et al. |
| 4,703,474 A | 10/1987 | Foschini et al. |
| 4,707,839 A | 11/1987 | Andren et al. |
| 4,718,080 A | 1/1988 | Serrano et al. |
| 4,730,340 A | 3/1988 | Frazier, Jr. |
| 4,742,512 A | 5/1988 | Akashi et al. |
| 4,755,983 A | 7/1988 | Masak et al. |
| 4,759,034 A | 7/1988 | Nagazumi |
| 4,775,995 A | 10/1988 | Chapman et al. |
| 4,789,983 A | 12/1988 | Acampora et al. |
| 4,799,253 A | 1/1989 | Stern et al. |
| 4,805,208 A | 2/1989 | Schwartz |
| 4,807,222 A | 2/1989 | Amitay |
| 4,811,421 A | 3/1989 | Havel et al. |
| 4,837,802 A | 6/1989 | Higashiyama et al. |
| 4,843,612 A | 6/1989 | Brusch et al. |
| 4,850,036 A | 7/1989 | Smith |
| 4,860,307 A | 8/1989 | Nakayama |
| 4,866,732 A | 9/1989 | Carey et al. |
| 4,894,842 A | 1/1990 | Broekhoven et al. |
| 4,899,364 A | 2/1990 | Akazawa et al. |
| 4,901,307 A | 2/1990 | Gilhousen et al. |
| 4,914,651 A | 4/1990 | Lusignan |
| 4,922,506 A | 5/1990 | McCallister et al. |
| 4,930,140 A | 5/1990 | Cripps et al. |
| 4,932,037 A | 6/1990 | Simpson et al. |
| 4,958,359 A | 9/1990 | Kato |
| 4,969,159 A | 11/1990 | Belcher et al. |
| 4,977,577 A | 12/1990 | Arthur et al. |
| 4,977,578 A | 12/1990 | Ishigaki et al. |
| 4,991,164 A | 2/1991 | Casiraghi et al. |
| 4,993,021 A | 2/1991 | Nannicini et al. |
| 5,005,169 A | 4/1991 | Bronder et al. |
| 5,016,255 A | 5/1991 | Dixon et al. |
| 5,016,256 A | 5/1991 | Stewart |
| 5,022,047 A | 6/1991 | Dixon et al. |
| 5,023,887 A | 6/1991 | Takeuchi et al. |
| 5,029,181 A | 7/1991 | Endo et al. |
| 5,040,238 A | 8/1991 | Comroe et al. |
| 5,048,052 A | 9/1991 | Hamatsu et al. |
| 5,056,109 A | 10/1991 | Gilhousen et al. |
| 5,073,900 A | 12/1991 | Mallinckrodt |
| 5,086,508 A | 2/1992 | Furuno |
| 5,093,840 A | 3/1992 | Schilling |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,129,098 A | 7/1992 | McGirr et al. |
| 5,257,283 A | 10/1993 | Gilhousen et al. |
| 5,265,119 A | 11/1993 | Gilhousen et al. |
| 5,267,262 A | 11/1993 | Wheatley, III |
| 5,299,226 A | 3/1994 | Schilling |
| 5,339,330 A | 8/1994 | Mallinckrodt |
| 5,386,588 A | 1/1995 | Yasuda |
| 5,396,516 A | 3/1995 | Padovani et al. |
| 5,535,238 A * | 7/1996 | Schilling et al. ............ 375/142 |
| 5,631,921 A * | 5/1997 | Schilling .................... 375/130 |
| 5,815,798 A * | 9/1998 | Bhagalia et al. ........... 455/13.4 |
| 6,226,316 B1 * | 5/2001 | Schilling et al. ............ 375/142 |

OTHER PUBLICATIONS

Scholtz, Robert A., "The Origins of Spread–Spectrum Communications", IEEE Transactions on Communications (May 1982), vol. Com. 30, No. 5; pp. 822–855.

Blasbalg, H., "A Comparison of Pseudo–Noise and Conventional Modulation for Multiple–Access Satellite Communications," IBM Journal of Research Development, vol. 9, No. 4, Jul. 1965, pp. 241–255.

Salmas; et al., "On the System Design Aspects of Code Division Multiple Access (CDMA) Applied to Digital Cellular and Personal Communication Networks" IEEE Vehicle Technology Conference, May 19–22, 1991, pp. 57–62.

Dixon, Robert C., Spread Spectrum Systems (John Wiley & Sons, Inc.: New York, 3d ed. 1994), pp. 412–413.

The International Dictionary of Physics and Electronics (D. Van Nostrand Co.: Princeton, NJ, 2d ed. 1961), pp. 612, 952.

Alavi, Hossein, Power Control and Interference Management in a Spread–Spectrum Cellular Mobile Radio System (1984) (Unpublished Ph.D. Dissertation, Michigan State University).

M.B. Pursley, "Performance Evaluation for Phase–Coded Spread–Spectrum Multiple–Access Communication—Part I: System Analysis", IEEE Transactions on Communications, Com–25, No. 8, Aug., 1997.

J.M. Holtzman, "A Simple, Accurate Method To Calculate Spread–Spectrum Multiple–Access Error Probabilities", IEEE Transactions on Communications, vol. 40, No. 3, Mar. 1992.

Ormondroyd, R.F., "Power Control for Spread–Spectrum Systems," Conference on Communications Equipment and Systems, 20–22, Apr. 1982, pp. 109–115.

IS95, Section 7.1.3.1.7 and Fig. 7.1.3.1.7–2.

Fluhr, Z.C. and Porter, P.T., AAdvanced Mobile Phone Service: Control Architecture@, The Bell system Technical Journal (Jan. 1979), vol. 58, No. 1, pp. 43–69.

Scholtz, Robert A., The Origins of Spread–Spectrum Communications@, IEEE Transactions on Communications (May 1982), vol. Com. 30, No. 5; pp. 822–855.

Blasbalg, H., A Comparison of Pseudo–Noise and Conventional Modulation for Multiple–Access Satellite Communications,@ IBM Journal of Research Development, vol. 9, No. 4, Jul. 1965, pp. 241–255.

Salmasi; et al., On the System Design Aspects of Code Division Multiple Access (CDMA) Applied to Digital Cellular and Personal Communication Networks IEEE Vehicle Technology Conference, May 19–22, 1991, p. 57–62.

The International Dictionary of Physics and Electronics (D. Van Nostrand Co.: Princeton, NJ, 2d ed. 1961), pp. 612, 952.

M.B. Pursley, Performance Evaluation for Phase–Coded Spread–Spectrum Multiple–Access Communication—Part I: System Analysis@, IEEE Transactions on Communications, Com–25, No. 8, Aug., 1997.

J.M. Holtzman, A Simple, Accurate Method To Calculate Spread–Spectrum Multiple–Access Error Probabilities@, IEEE Transactions on Communications, vol. 40, No. 3, Mar. 1992.

Ormondroyd, R.F., Power Control for Spread–Spectrum Systems,@ Conference on Communications Equipment and Systems, 20–22, Apr. 1982, pp. 109–115.

* cited by examiner

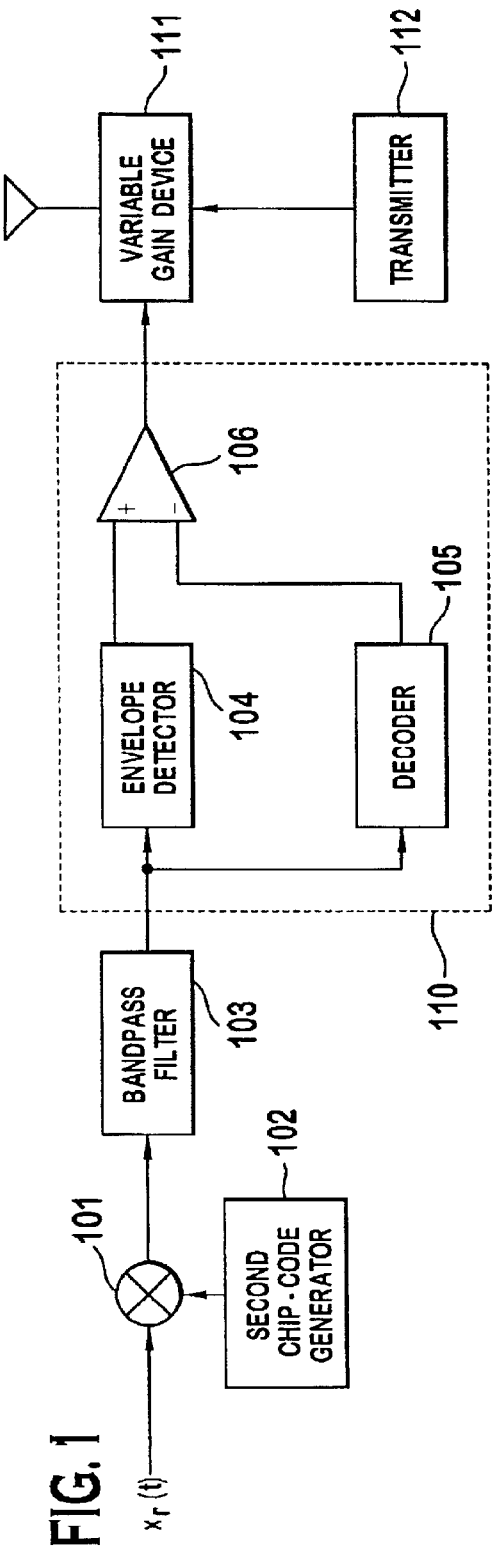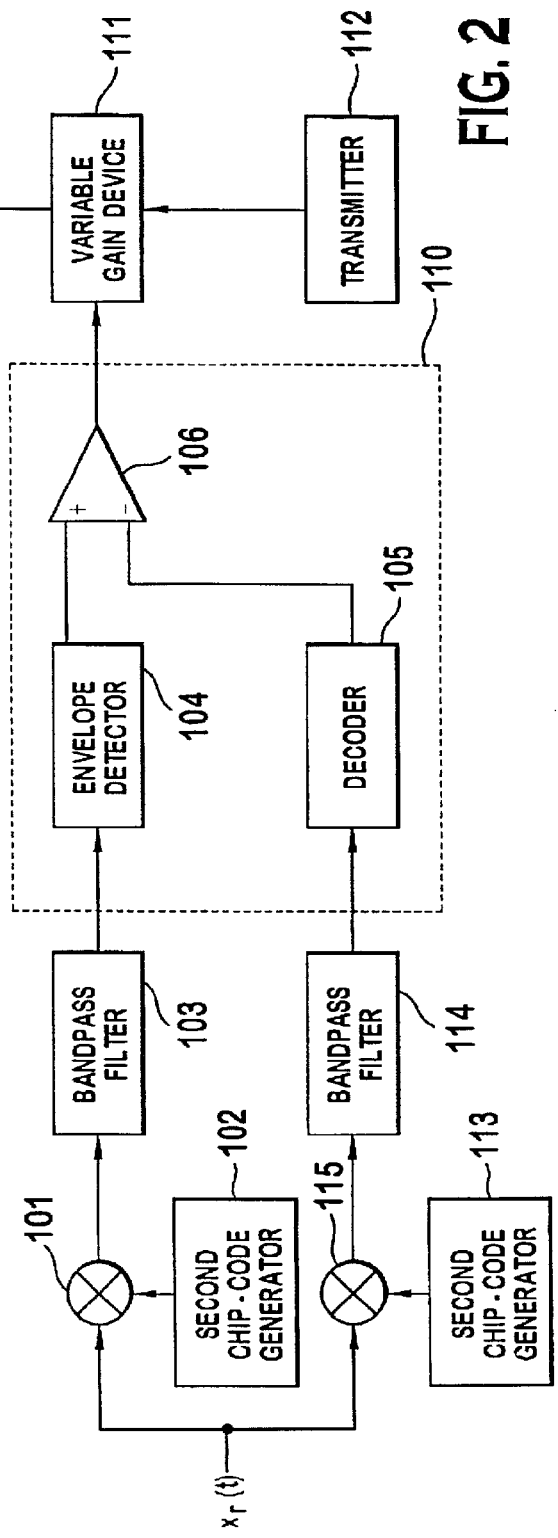

SPREAD SPECTRUM ADAPTIVE POWER CONTROL COMMUNICATIONS SYSTEM AND METHOD

RELATED APPLICATIONS

This application is a continuation-in-part of U.S. patent application Ser. No. 09/167,388, filed on Oct. 6, 1998 now U.S. Pat. No. 6,226,316; which is a continuation of U.S. patent application Ser. No. 08/666,069, filed on Jun. 21, 1996 abandoned; which is a continuation of U.S. patent application Ser. No. 08/218,198, filed on Mar. 28, 1994, which issued on Jul. 9, 1996 as U.S. Pat. No. 5,535,238; which is a continuation-in-part of U.S. patent application Ser. No. 07/792,869, filed on Nov. 19, 1991, which issued on Mar. 29, 1994 as U.S. Pat. No. 5,299,226; which is a continuation-in-part of U.S. patent application Ser. No. 07/614,816, filed on Nov. 16, 1990, which issued on Mar. 3, 1992 as U.S. Pat. No. 5,093,840.

BACKGROUND OF THE INVENTION

This invention relates to spread-spectrum communications, and more particularly to an apparatus and method for adaptive power control of spread-spectrum signal in a cellular, personal communications environment.

DESCRIPTION OF THE PRIOR ART

A spread-spectrum signal typically is generated by modulating an information-data signal with a chip-code signal. The information-data signal may come from a data device such as a computer, or an analog device which outputs an analog signal which has been digitized to an information-data signal, such as voice or video. The chip-code signal is generated by a chip-code where the time duration, $T_c$, of each chip is substantially less than a data bit or data symbol.

Spread-spectrum modulation provides means for communicating in which a spread-spectrum signal occupies a bandwidth in excess of the minimum bandwidth necessary to send the same information. The band spread is accomplished using a chip code which is independent of an information-data signal. A synchronized reception with the chip-code at a receiver is used for despreading the spread-spectrum signal and subsequent recovery of data from the spread-spectrum signal.

Spread-spectrum modulation offers many advantages as a communications system for an office or urban environment. These advantages include reducing intentional and unintentional interference, combating multipath problems, and providing multiple access to a communications system shared by multiple users. Commercially, these applications include, but are not limited to, local area networks for computers and personal communications networks for telephone, as well as other data applications.

A cellular communications network using spread-spectrum modulation for communicating between a base station and a multiplicity of users, requires control of the power level of a particular mobile user station. Within a particular cell, a mobile station near the base station of the cell may be required to transmit with a power level less than that when the mobile station is near an outer perimeter of the cell. This is done to ensure a constant power level at the base station, received from each mobile station.

In a first geographical region, such as an urban environment, the cellular architecture within the first geographical region may have small cells which are close to each other, requiring a low power level from each mobile user. In a second geographical region, such as a rural environment, the cellular architecture within the region may have large cells which are spread apart, requiring a relatively high power level from each mobile user. A mobile user who moves from the first geographical region to the second geographical region typically adjusts the power level of his transmitter, for meeting the requirements of a particular geographic region. Otherwise, if the mobile user traveled from a sparsely populated region with fewer spread out cells using the relatively higher power level with his spread-spectrum transmitter, to a densely populated region with many cells, without reducing the power level of his spread-spectrum transmitter, his spread-spectrum transmitter may cause undesirable interference within the cell in which he is located and/or to adjacent cells. Also, if a mobile user moves behind a building and has his signal to the base station blocked by the building, then the mobile user's power level should be increased. And doing this quickly, with high dynamic range and in a manner to ensure an almost constant received power level with low root mean square error and peak deviations from this constant level.

Accordingly, there is a need to have a spread-spectrum system and method for automatically controlling a mobile user's spread-spectrum transmitter power level when operating in a cellular communications network.

SUMMARY OF THE INVENTION

A spread spectrum communication system has a mobile station and a base station. The base station transmits a spread spectrum signal and a threshold. The mobile station receives the spread spectrum signal and the threshold. A received power level of the received spread spectrum signal is measured. The received power lever is compared to the threshold. The mobile station's transmission level is adjusted based on in part a result of the comparison.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 1 shows an adaptive power control receiver and transmitter according to the present invention;

FIG. 2 shows an adaptive power control receiver and transmitter according to the present invention;

DETAILED DESCRIPTION OF THE PREFERRED EMBODIMENTS

Figure 3:
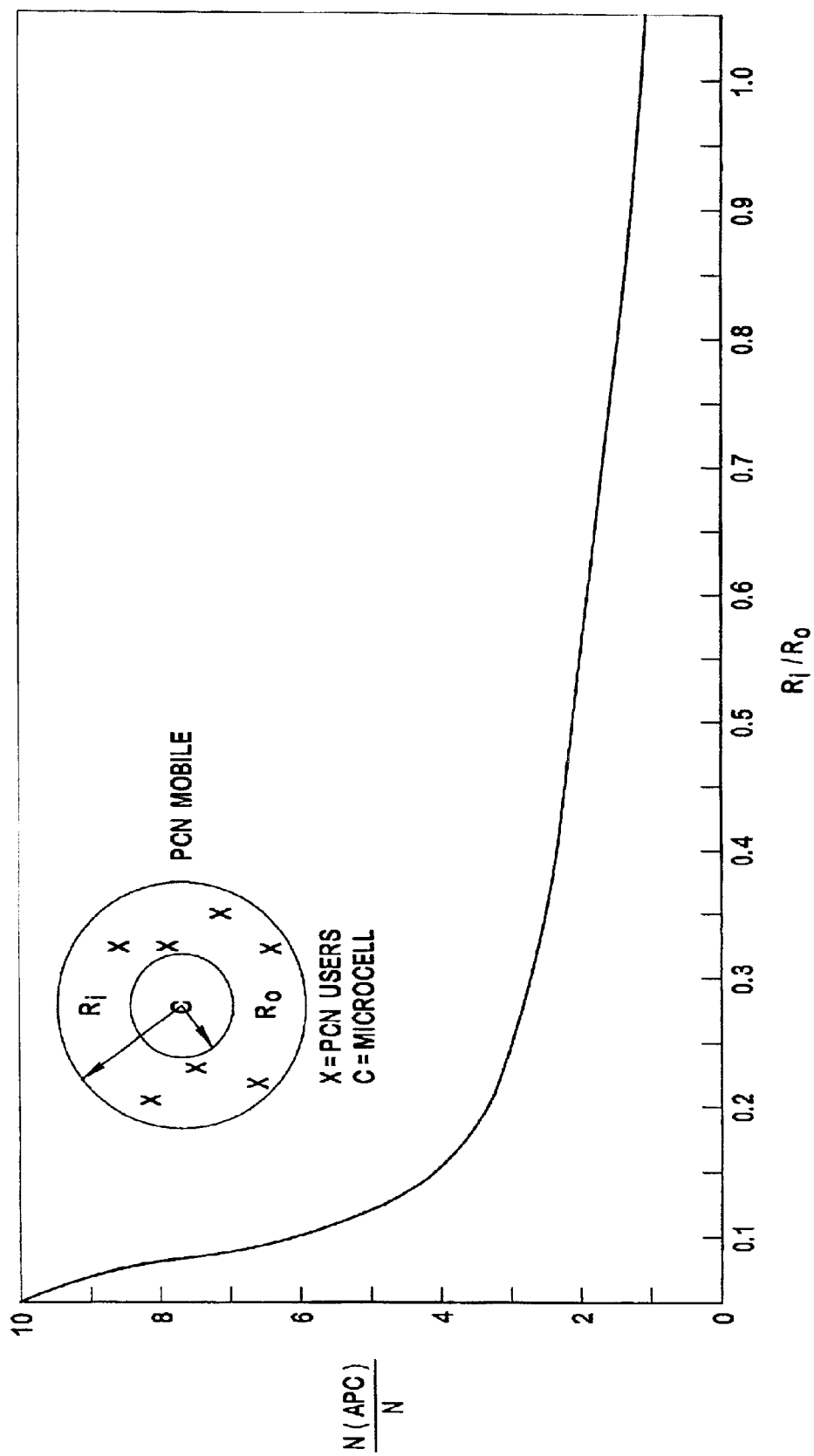
FIG. 3 shows the relative effect of a multiplicity of users communicating with spread spectrum in a cellular environment with and without using adaptive power control.

Reference now is made in detail to the present preferred embodiments of the invention, examples of which are illustrated in the accompanying drawings, wherein like reference numerals indicate like elements throughout the several views.

The present invention assumes that a plurality of mobile stations operate in a cellular-communications network using spread-spectrum modulation. The cellular communications network has a plurality of geographical regions, with a multiplicity of cells within a geographical region. The size of the cells in a first geographical region may differ from the size of the cells in a second geographical region. In a first geographical region such as an urban environment, a cellular architecture within the region may have a large number of cells of small area which are close to each other. In a second geographical region such as a rural environment, a cellular architecture within the region may have cells of larger a area. Further, within a specified geographic region, the size of the cells may vary.

A mobile station while in the first geographical region may be required to transmit a lower power level than while in the second geographical region. This requirement might be due to a decreased range of the mobile station from the base station. Within a particular cell, a mobile station near the base station of the cell may be required to transmit with a power level less than that when the mobile station is near an outer perimeter of the cell. This is done to ensure a constant power level at the base station, received from each mobile station.

For discussion purposes, a mobile station within a particular cell transmits a first spread-spectrum signal, and the base station transmits a second spread-spectrum signal. The APC-data signal may be transmitted with or separate from the generic spread-spectrum signal. For example, a spread-spectrum signal using a first chip code may be considered a first channel having the generic spread-spectrum signal, and a spread spectrums signal using a second chip code may be considered a second channel. The APC-data signal may be transmitted in the same channel, i.e. the first channel, as the generic spread-spectrum signal, or in a second channel which is different from the generic spread-spectrum signal.

In the exemplary arrangement shown in FIG. 1, an apparatus for adaptive-power control of a spread-spectrum transmitter is provided. Each mobile station comprises acquisition means, detector means, decoder means, difference means, transmitter means, an antenna, and variable-gain means. The apparatus, by way of example, may have the acquisition means embodied as a first product device 101, a first chip-code generator 102, and a bandpass filter 103. The detector means may be embodied as envelope detector 104. Other type detectors may be used with the present invention, such as square law detectors or coherent detectors, as is well known in the art. The decoder means may be embodied as decoder 105. The difference means may be embodied as differential amplifier 106, the transmitter means as transmitter 112 and the variable gain means as variable-gain device 111. The variable-gain device 111 may be a variable-gain amplifier, a variable-gain attenuator or any device which performs the same function as the variable-gain device 111 and described herein.

The first product device 101 is coupled to the first chip-code generator 102 and to the bandpass filter 103. The envelope detector 104 is coupled between the bandpass filter 103 and the differential amplifier 106. The decoder 105 is coupled between the bandpass filter 103 and the differential amplifier 106. The decoder 105 alternatively may be coupled to the output of the envelope detector 104. The variable-gain device 111 is coupled to the differential amplifier 106 and between the transmitter 112 and antenna.

The decoder 105, as illustratively shown in FIG. 2, alternatively may be coupled between a second bandpass filter 114 and differential amplifier 106. In this particular embodiment, the second bandpass filter 114 is coupled to a second product device 115. The second product device 115 is connected to a second chip-code generator 113. The embodiment of FIG. 2 could be used where the APC-data signal is transmitted over the second channel simultaneously while the generic spread-spectrum signal is transmitted over the first channel. The second channel uses a spread-spectrum signal with a second chip code, and the second chip-code generator 118 generates a second chip-code signal using the second chip code.

The product device 101, FIG. 1 or 2, using a first chip-code signal from the first chip-code generator 102 acquires the generic spread-spectrum signal transmitted from the base station. The first chip-code signal has the same chip code as the generic spread-spectrum signal. The envelope detector 104 detects a received power level of the generic spread-spectrum signal. The received power level may be measured at the detector.

The decoder 105 decodes the APC-data signal from the generic spread-spectrum signal as a threshold. More particularly, data which establishes or sets the threshold for differential amplifier 106 is sent with the APC-data signal.

The differential amplifier 106 generates a comparison signal by comparing the received power level of the generic spread-spectrum signal to the threshold. The differential amplifier 106 may employ a differential amplifier or other circuits for performing the comparison function.

The transmitter 112 transmits a transmitter spread-spectrum signal. The variable-gain device 111 using the comparison signal, adjusts a transmitter-power level of the transmitter spread-spectrum signal from the transmitter. The variable-gain device 111 may be realized with a variable-gain amplifier, a variable-gain attenuator, or an equivalent device which can adjusts the power level of the transmitter spread-spectrum signal.

In operation, a base station in a cell may transmit the generic spread-spectrum signal on a continuous basis or on a repetitive periodic basis. Mobile stations within the cell receive the generic spread-spectrum signal. The received generic spread-spectrum signal is acquired and despread with the first chip-code signal from first chip-code generator 102 and first product device 101. The despread generic spread-spectrum signal is filtered through bandpass filter 103. The mobile station detects the despread generic spread-spectrum signal using envelope detector 104, and measures the received power level of the generic spread-spectrum signal.

The APC-data signal may be transmitted on the same channel as the generic spread-spectrum signal using the same chip code as the generic spread-spectrum signal. In this case, the APC-data signal is transmitted at a different time interval from when the generic spread-spectrum signal is transmitted. This format allows the mobile station to acquire synchronization with the first chip-code, using the generic spread-spectrum signal.

As an alternative, the APC-data signal may be transmitted on a different coded channel using a second chip code. In the latter case, the second spread-spectrum signal having the APC-data signal would be acquired by the second chip-code generator 202 and second product device 201. In either case, the APC-data signal is decoded using decoder 105. Further, the APC-data signal may be time division multiplexed or frequency division multiplexed with the generic spread-spectrum signal.

The decoder 105 decodes from the APC-data signal the value of the threshold for use by differential amplifier 106. For example, if there were eight levels for which to set the threshold level, then at minimum, a three bit word may be used with the APC-data signal to transmit the threshold to the mobile station. The threshold is used to adjust and or set the threshold of the differential amplifier 106. Accordingly, the received power level from envelope detector 104 is compared to the threshold of the differential amplifier 106.

If the received power level is greater than the threshold, then the variable-gain device 111 would decrement or decrease the transmitter spread-spectrum power level. If the received power level is less than the threshold at differential amplifier 106, then the variable-gain device 111 increases the transmitter spread-spectrum power.

The APC circuit 110 of FIGS. 1 and 2 may be built on a digital signal processor chip. An analog to digital converter located at the output of the bandpass filter 103 would convert the received signal to a data signal. The envelope detector 104, decoder 105 and differential amplifier 106 may be implemented as part of digital signal processing functions on the digital signal processor (DSP) chip. The analog to digital converters may be included on the DSP chip.

FIG. 3 shows the advantage of using an adaptive power control apparatus with a mobile station in a personal communications network. The number of adaptive power control mobile stations, N(APC), versus the number of mobile stations which can be used in a similar region, N, is plotted with respect to an inner radius, $R_i$, and an outer radius, $R_o$. When the inner radius goes to zero, using spread spectrum as code division multiplex, the number of users with adaptive power control who can operate within a cell, is approximately ten times the number of users without adaptive power control who can operate within the cell.

Figure 4:
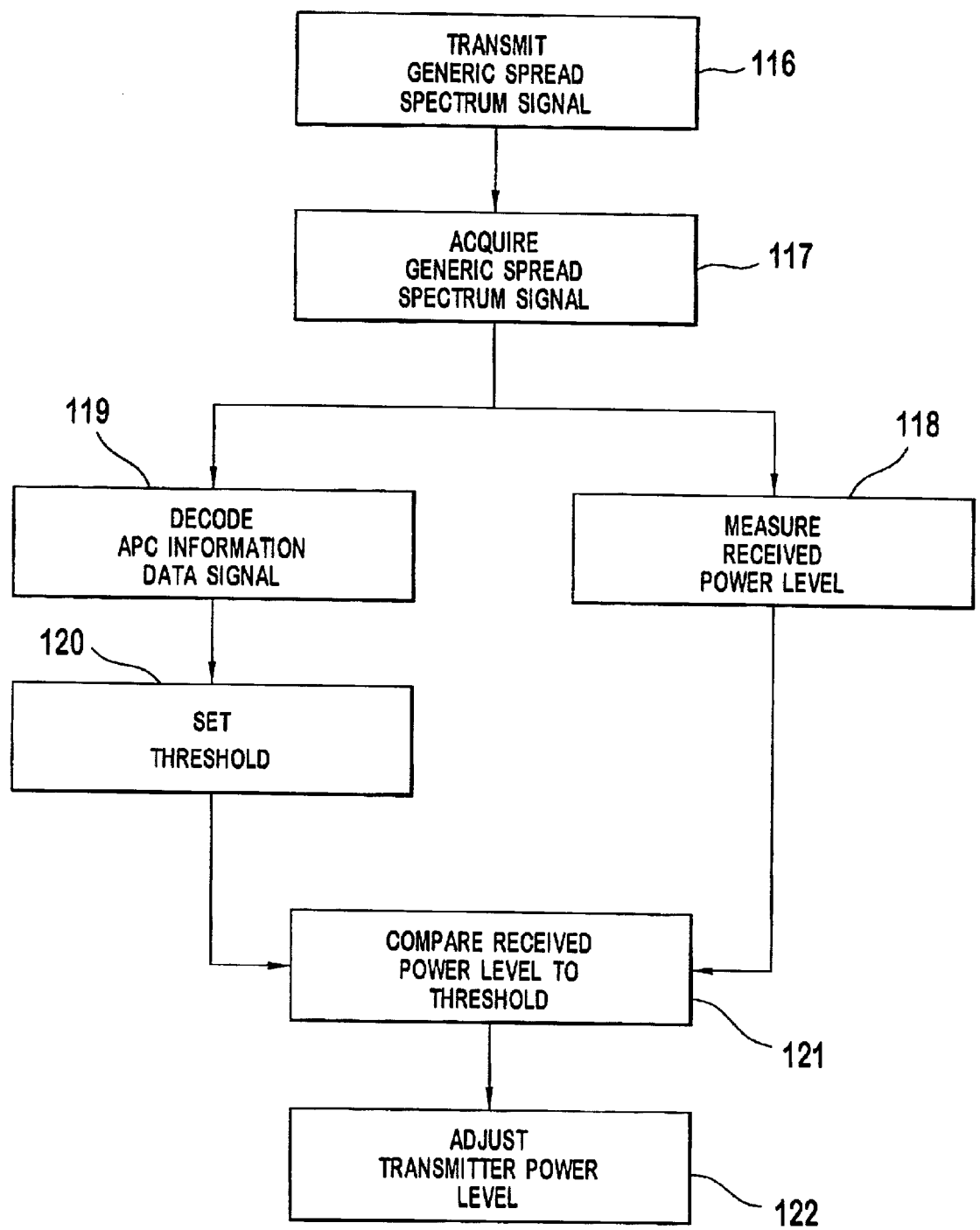
FIG. 4 is a flow chart of the method of the present invention.

The present invention also includes a method for automatic-power control of a spread-spectrum transmitter for a mobile station operating in a cellular-communications network using spread-spectrum modulation. Referring to FIG. 4, a base station transmits 116 a generic spread-spectrum signal and an APC information-data signal. Each mobile station performs the steps of acquiring 117 the generic spread-spectrum signal transmitted from the base station, and detecting 118 a received power level of the generic spread-spectrum signal. The steps also include decoding 119 the APC-data signal as a threshold, from the generic spread-spectrum signal, or from a separate signal from the generic spread-spectrum signal. A threshold is set 120 from the APC-data signal. The method further includes comparing 121 the received power level to the threshold, and adjusting 122 a transmitter power level of a transmitter spread-spectrum signal in response to the comparison.

Figure 5:
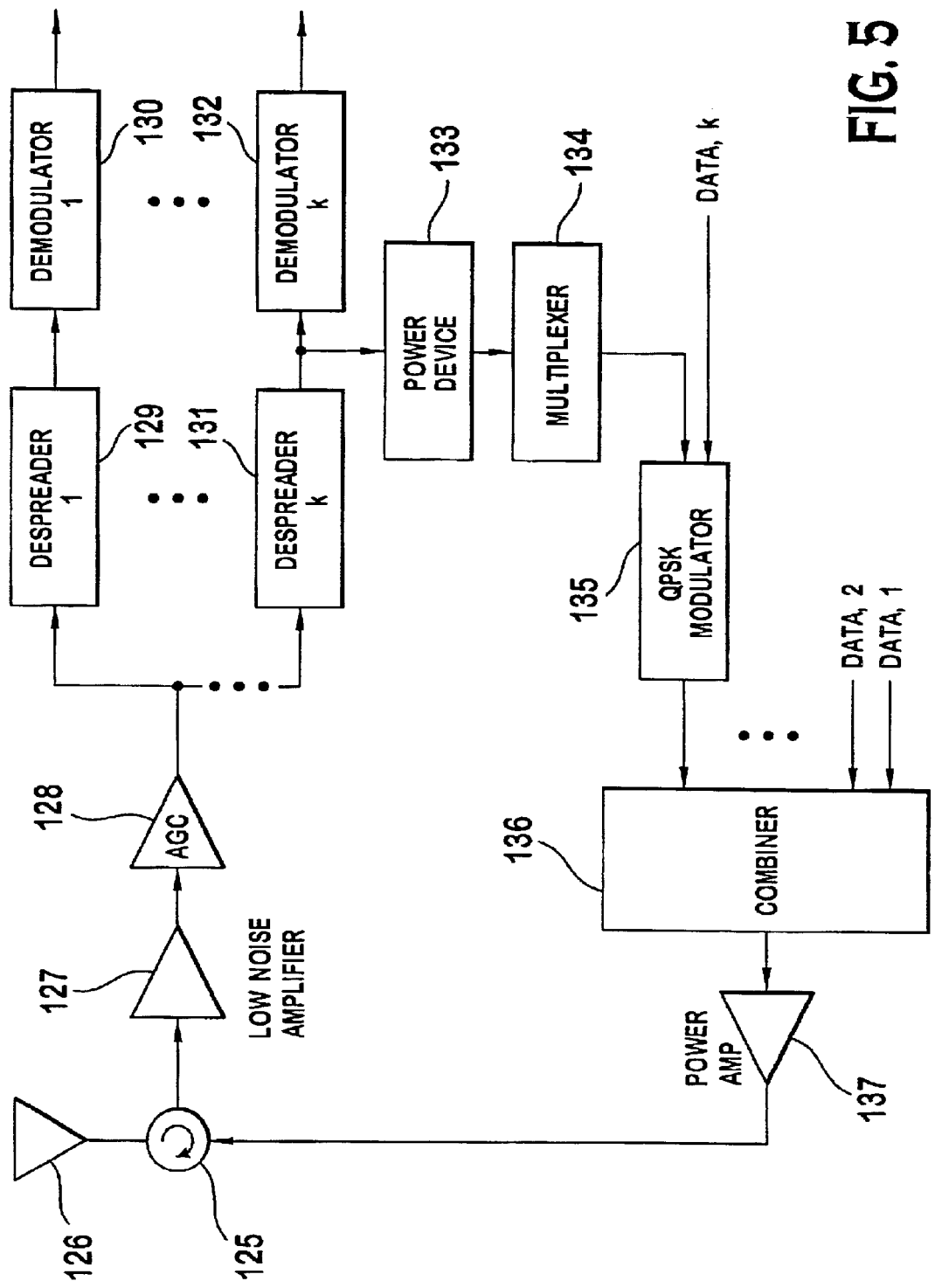
FIG. 5 is a block diagram of a base station.

In the exemplary arrangement shown in FIG. 5, a block diagram of a base station as part of a system for adaptive-power control of a spread-spectrum transmitter is provided. The base station comprises automatic-gain-control (AGC) means, base-correlator means, power means, transmitter means, and an antenna 126. The AGC means is coupled between the antenna 126 and the base-correlator means. The power means is coupled between the base-correlator means and the transmitter means. The transmitter means is coupled to the antenna 126.

A received signal at the AGC means typically includes all of the incoming spread spectrum signals, unwanted interfering signals and thermal noise. The AGC means generates an AGC-output signal from the received signal.

The AGC-output signal is passed to the base-correlator means. The base-correlator means despreads the AGC-output signal as a despread AGC-output signal. The power means processes the AGC-output signal as a received-power level. In response to comparing the received-power level to a threshold, the power means generates a power-command signal. The power-command signal is transmitted by the transmitter means as a second spread-spectrum signal to the mobile station.

The power-command signal indicates whether the mobile station is to increase or decrease its power level. The determination of whether to increase or decrease the power level is made by comparing the received-power level to the threshold. If the received-power level exceeded the threshold, then the power-command signal sends a message to the mobile station to decrease its transmitter power. If the received-power level were below the threshold, then the power-command signal sends a message to the mobile station to increase its transmitter power.

The power-command signal may be transmitted with or separate from the second spread-spectrum signal. For example, a spread-spectrum signal using a first chip sequence may be considered a first spread-spectrum channel, and a spread-spectrum signal using a second chip sequence may be considered a second spread-spectrum channel. The power-command signal may be transmitted in the same spread-spectrum channel, i.e., the first spread-spectrum channel, as the second spread-spectrum signal, or in a second spread-spectrum channel which is different from the second spread-spectrum signal.

The base-correlator means is depicted in FIG. 5 as despreader k 131. The system, by way of example, may have the base-correlator means embodied as a product device, a chip-sequence generator, and a bandpass filter. Alternatively, the base-correlator means may be realized as a matched filter such as a surface-acoustic-wave device. In general, the base-correlator means uses or is matched to the chip sequence of the spread-spectrum signal being received. Correlators and matched filters for despreading a spread-spectrum signal are well known in the art.

Typically, the AGC circuit 128 is coupled to a low noise amplifier 127, through an isolator 125 to the antenna 126. In FIG. 5 a plurality of despreaders, despreader 129 through despreader 131, are shown for despreading a plurality of spread spectrum channels, which may be received from a plurality of mobile stations. Similarly, the output of each despreader 129 through despreader 131 is coupled to a plurality of demodulators, demodulator 130 through demodulator 132, respectively, for demodulating data from the despread AGC-output signal. Accordingly, a plurality of data outputs are available at the base station.

For a particular $k^{th}$ spread-spectrum channel, despreader 131 is shown coupled to power device 133 and multiplexer 134. The power device 133 typically is a power-measurement circuit which processes the despread AGC-output signal as a received-power level. The power device 133 might include an analog-to-digital converter circuit for outputting a digital received-power level. The power device 133 also may include a comparator circuit for comparing the received-power level to a threshold. The multiplexer 134 is coupled to the output of the power device 133. The multiplexer 134 may insert appropriate framing bits, as required.

The transmitter means is embodied as a quadrature phase shift keying (QPSK) modulator 135 coupled to a power amplifier 137. In FIG. 1, the input to the QPSK modulator 135 typically would have the power-command signal from the power device 133 multiplexed with data from the kit channel. A plurality of spread spectrum channels would have their data and appropriate power-command signals combined by combiner 136 and amplified by power amplifier 137. The output of the power amplifier 137 is coupled through the isolator 125 to antenna 126.

The power command signal is transmitted periodically. The period T is chosen typically to be 250 microseconds in order to ensure a low root mean square error as well as a low peak error between the instantaneous received signal and the constant desired signal.

Figure 6:
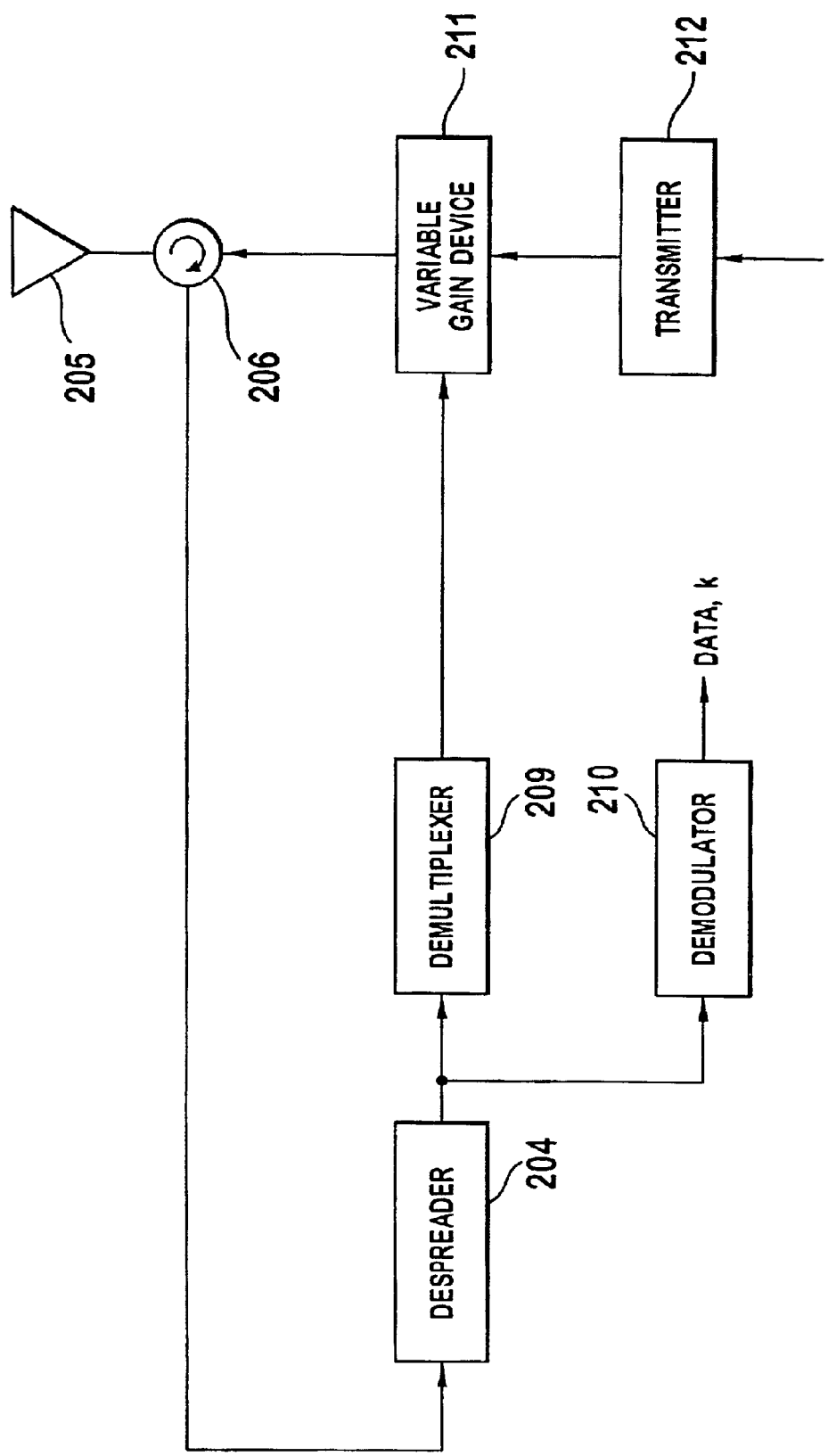
FIG. 6 is a block diagram of a mobile station.

A mobile station illustratively is shown in FIG. 6. The mobile-despreading means is illustrated as despreader 204 and variable-gain means is illustrated as a variable-gain device 211. The variable-gain device 211 is coupled between the transmitter 212 and through isolator 206 to antenna 205. The despreader 204 is coupled to the isolator 206 and to demultiplexer 209. The output of the despreader 204 is also coupled to a demodulator 210. The despreader 204 may be embodied as appropriate correlator, or match filter, for despreading the $k^{th}$ channel. Additional circuitry may be used, such as radio frequency (RF) amplifiers and filters, intermediate frequency (IF) amplifiers and filters, as is well known in the art.

A received second spread-spectrum signal at antenna 205 passes through isolator 206 to despreader 204. The despreader 204 is matched to the chip sequence of the desired $k^{th}$ spread-spectrum channel. The output of the despreader 204 passes through the demodulator 210 for demodulating the data from the $k^{th}$ channel. Additionally, the demultiplexer 209 demultiplexes the power-command signal from the despread signal outputted from despreader 204. The power-command signal drives variable-gain device 211.

The variable-gain device 211 may be embodied as a variable-gain amplifier, a variable-gain attenuator, or any device which performs the same function as the variable-gain device 211 as described herein. The variable-gain device 211 increases or decreases the power level of the remote station transmitter, based on the power-command signal.

Figure 7:
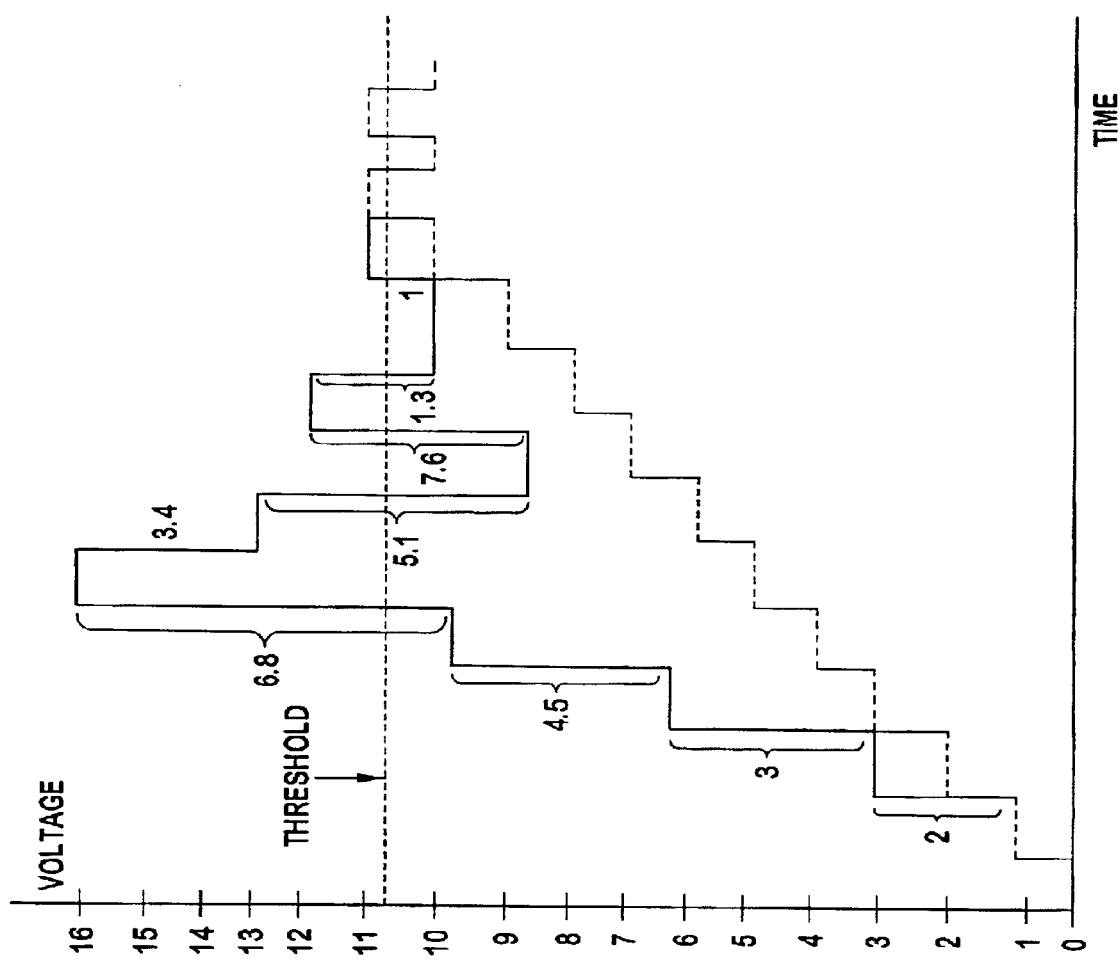
FIG. 7 illustrates linear and nonlinear power adjustment.

Adjustment of the power level of the remote station transmitter may be effected either linearly or nonlinearly. As illustrated in FIG. 7, to increase the power level using linear adjustment, for example, the transmitter power is increased in regular increments of one volt, or other unit as instructed by the base station, until the power level received at the base station is sufficiently strong. Linear adjustment may be time consuming if the power adjustment necessary were substantial.

As shown in FIG. 7, to increase the power using nonlinear adjustment, the transmitter voltage may be increased, by way of example, geometrically until the transmitted power is in excess of the desired level. Transmitter power may be then reduced geometrically until transmitted power is below the desired level. A preferred approach is to increase the step size voltage by a factor of 1.5 and to decrease the step size by a factor of 0.5. Other nonlinear algorithms may be used. As shown in FIG. 4, this process is repeated, with diminishing margins of error in both excess and insufficiency of desired power, until the desired signal level has been obtained. Nonlinear adjustment provides a significantly faster rise and fall time than does linear adjustment, and may be preferable if power must be adjusted significantly.

Figure 9:
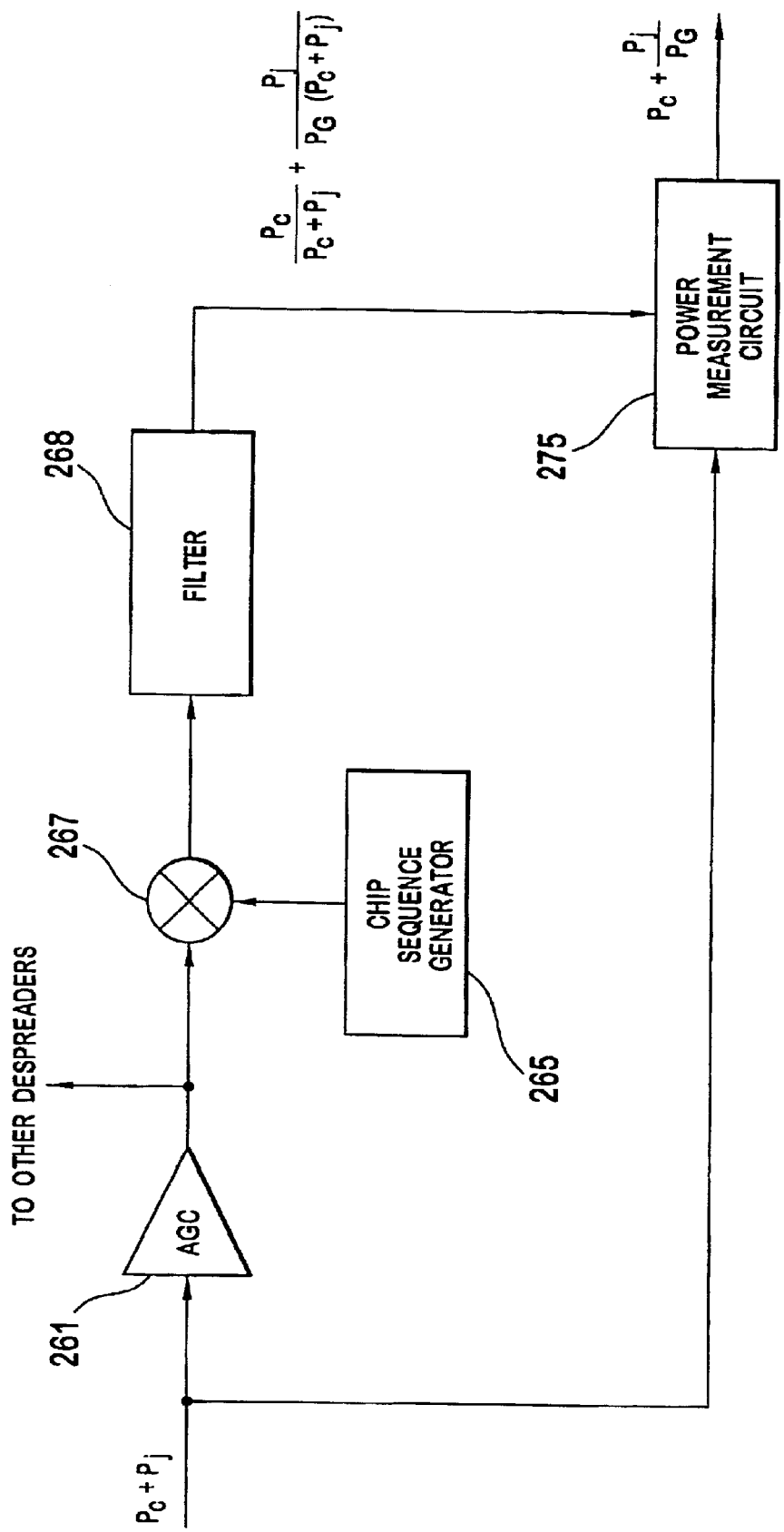
FIG. 9 is a block diagram for an interference rejection circuit.

As illustratively shown in FIG. 9, a block diagram of a power measurement circuit with interference rejection is shown for use with the base station. A correlator is shown with the mixer 267 coupled between the chip-sequence generator 265, and filter 268. Additionally, AGC means and power means are included. The AGC means is embodied as an automatic-gain-control (AGC) circuit 61, and the power means is embodied as a power measurement circuit 275. As shown in FIG. 9, the AGC circuit 261 is connected to the mixer 267, and the output of the filter 268 is connected to the power measurement circuit 275. Additionally, the input to the AGC circuit 261 is connected to the power measurement circuit 275.

A received signal includes a first spread-spectrum signal with power $P_C$ and the other input signals which are considered to be interfering signals with power $P_J$ at the input to the circuit of FIG. 9. The interfering signal may come from one or more nondesirable signals, noise, multipath signals, and any other source which would serve as an interfering signal to the first spread-spectrum signal. The received signal is normalized by the AGC circuit 261. Thus, by way of example, the AGC circuit 261 can have the power output, $P_C+P_J=1$. The normalized received signal is despread by the correlator to receive a particular mobile user's signal, which in this case is shown by way of example as the mixer 267, chip-code generator 265 and filter 268. The chip-code generator 265 generates a chip-sequence signal using the same chip-sequence as the first spread-spectrum signal. The despread signal is filtered by filter 268, and the output of the filter 268 is the normalized power of the first spread-spectrum signal plus the normalized power of the interfering signal divided by the processing gain, PG, of the spread-spectrum system. The power measurement circuit 275 can process the despread-received signal with the received signal and output the received-power level of the first spread-spectrum signal. The power level of the interfering signal is reduced by the processing gain, PG.

The power measurement circuit 275 can process the received signal with the despread, normalized received signal by multiplying the two signals together, or by logarithmically processing the received signal with the despread received signal. In the latter case, the logarithm is taken of the power of the received signal, $P_C+P_J$, and the logarithm is taken of the despread, normalized received signal. The two logarithms are added together to produce the received-power level.

A key element for the present invention to work is to keep almost constant the despread signal, independently of variations of the other signals or of obstructions. A preferred implementation to accomplish this end is shown in the circuitry of FIG. 9. FIG. 9 shows a way for determining at the base station the power of the first spread-spectrum signal when the received signal includes multiple signals and noise. If the circuitry of FIG. 9 were not used, then it is possible that the interfering signal, which may include noise, multipath signals, and other undesirable signals, may raise the power level measured at the input to the receiver of the base station, thereby suppressing the first spread spectrum signal. The undesirable power level measured may cause the remote station to transmit more power than required, increasing the amount of power received at the base station.

Figure 10:
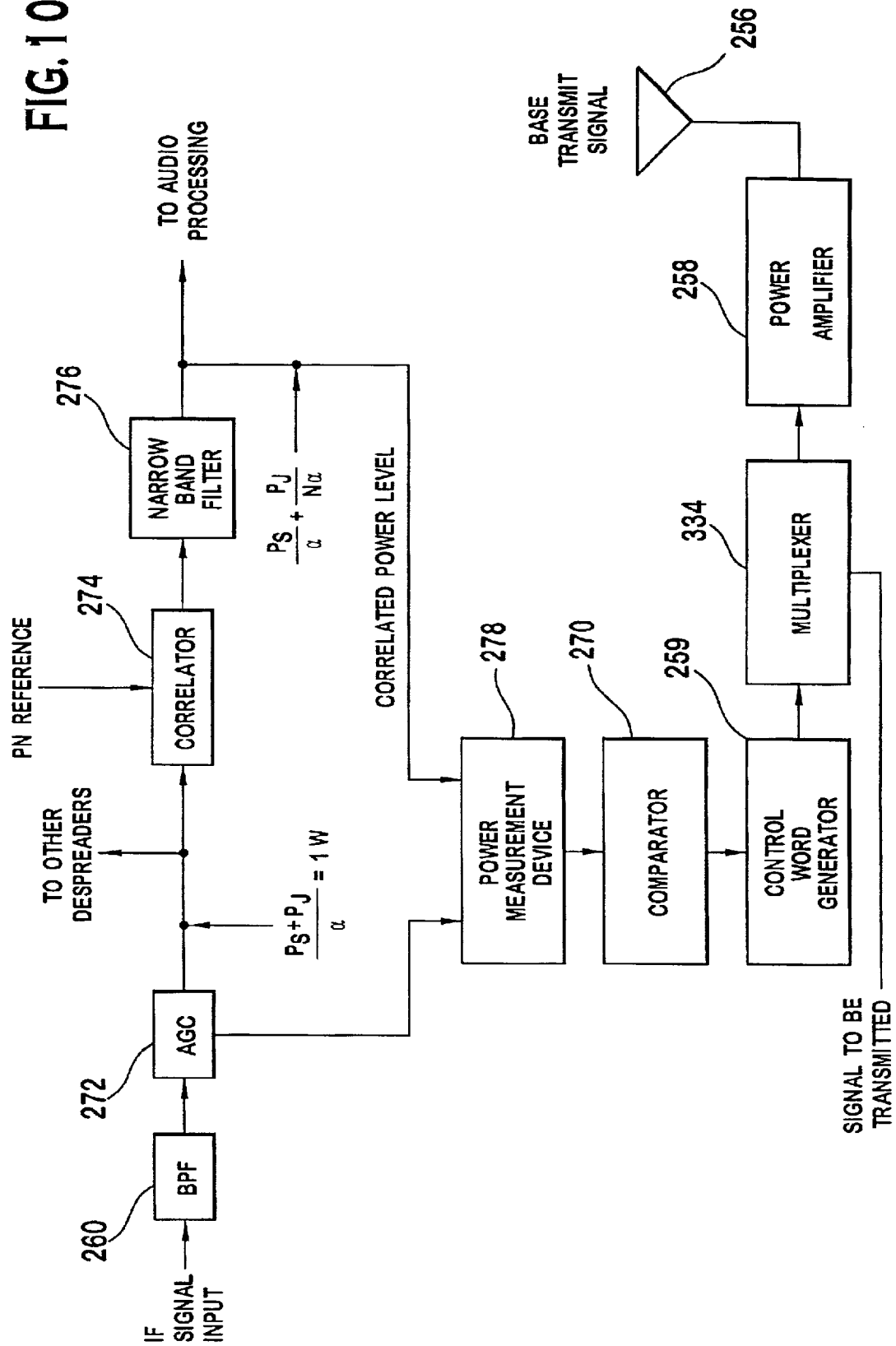
FIG. 10 is a block diagram of a base station with interference rejection.

FIG. 10 illustrates the base station automatic power control circuit of FIG. 9, with the concepts from FIG. 9 added thereto. Shown in FIG. 10 are automatic gain control (AGC) means, power means, comparator means, transmitter means, and an antenna. The AGC means is shown as an automatic-gain-control (AGC) amplifier 272, correlator means is shown as correlator 274 with filter 276, and power means is shown as power measurement device 278. The comparator means is shown as comparator 270, the transmitter means is shown as power amplifier 258 coupled to the antenna 256. Also illustrated is a control word generator 259 coupled between comparator 270 and power amplifier 258.

The AGC amplifier 272 is coupled between the bandpass filter 260 and the correlator 274. The filter 276 is coupled to the output of the correlator 274. The power measurement device 278 is coupled to the AGC amplifier 272 and the filter 276. The comparator 270 is coupled to the output of the power measurement device 278 and to the control word generator 259. The multiplexer 334 is coupled between the control word generator 259 and the power amplifier 258. The control word generator 259 is coupled between the comparator 270 and the multiplexer 334. The power amplifier 258 is coupled to the antenna 256.

A threshold level is used by the comparator 270 as a comparison for the received-power level measured by the power measurement device 278.

For each received signal, the AGC amplifier 272 generates an AGC-output signal. The AGC-output signal is despread to obtain the signal of user one using correlator 274 and filter 276. The despread-AGC-output signal from the filter 276 is processed with the received signal from the AGC amplifier 272, by the power measurement device 278. The received signal to the power measurement device 278 may be a AGC-control-voltage level from the AGC amplifier 272.

The power measurement device 278 processes the received signal with the despread-AGC-output signal, for generating a received-power level. As mentioned previously for FIG. 5, the power measurement device can process the received signal with the despread-AGC-output signal by multiplying the two signals together, or by logarithmically processing the received signal with the despread-AGC-output signal.

The comparator 270 generates a comparison signal by comparing the received-power level generated by the power measurement device 278, to the threshold level. The comparison signal may be an analog or digital data signal. Broadly, the control word generator 259 can convert the comparison signal to a digital data signal, i.e., the power-command signal, for controlling the variable-gain device 211 of FIG. 6. The variable-gain device 211 uses the power-command signal, as processed by the control word generator 159, as a basis for adjusting a transmitter-power level of the first spread-spectrum signal transmitted by the mobile station.

In operation, a mobile station in a cell may transmit the first spread-spectrum signal on a continuous basis or on a repetitive periodic basis. The base station within the cell receives the first spread-spectrum signal. The received first spread-spectrum signal is acquired and despread with the chip-sequence signal from chip-sequence generator and product device. The despread first spread-spectrum signal is filtered through bandpass filter. The base station detects the despread first spread-spectrum signal using envelope detector, and measures or determines the received-power level of the first spread-spectrum signal. The base station generates the power-command signal from the received-power level.

The power-command signal may be transmitted on the same channel as the second spread-spectrum signal using the same chip sequence as the second spread-spectrum signal. In this case, the power-command signal is transmitted at a different time interval from when the second spread-spectrum signal is transmitted. This format allows the mobile station to acquire synchronization with the first sequence, using the second spread-spectrum signal.

As an alternative, the power-command signal may be transmitted on a different coded channel using a second chip sequence. In the latter case, the second spread-spectrum signal having the power-command signal would be acquired by the second chip-code generator and second product device. In either case, the power-command signal is demultiplexed using demultiplexer 209. Further, the power-command signal may be time division multiplexed or frequency division multiplexed with the second spread-spectrum signal.

The present invention also includes a method for automatic-power control of a spread-spectrum transmitter for a mobile station operating in a cellular-communications network using spread-spectrum modulation, with the mobile station transmitting a first spread-spectrum signal. In use, the method includes the step of receiving a received signal, generating an AGC-output signal, despreading the AGC-output signal, processing the despread AGC-output signal to generate a received-power level, generating a power-command signal, transmitting the power-command signal as a second spread-spectrum signal, despreading the power-command signal from the second spread-spectrum signal as a power-adjust signal, and adjusting a power level of the first spread-spectrum signal.

The received signal includes the first spread-spectrum signal and an interfering signal and is received at the base station. The AGC-output signal is generated at the base station and despread as a despread AGC-output signal. The despread AGC-output signal is processed at the base station to generate a received-power level.

The received-power level is compared to a threshold, with the comparison used to generate a power-command signal. If the received-power level were greater than the threshold, the power-command signal would command the mobile station to reduce transmitter power. If the received-power level were less than the threshold, the power-command signal would command the mobile station to increase transmitter power.

The power-command signal is transmitted from the base station to the mobile station as a second spread-spectrum signal. Responsive to receiving the second spread-spectrum signal, the mobile station despreads the power-command signal as a power-adjust signal. Depending on whether the power-command signal commanded the mobile station to increase or decrease transmitter power, the mobile station, responsive to the power adjust signal, increases or decreases the transmitter-power level of the first spread-spectrum signal, respectively.

The method may additionally include generating from a received signal an AGC-output signal, and despreading the AGC-output signal. The received signal includes the first spread-spectrum signal and an interfering signal. The received signal is processed with the despread AGC-output signal to generate a received-power level. The method then generates a comparison signal by comparing the received-power level to the threshold level. While transmitting a second spread-spectrum signal, the method adjusts a transmitter-power level of the first spread-spectrum signal from the transmitter using the power-adjust signal.

PERFORMANCE OF THE INVENTION

A spread spectrum base station receives all incoming signals simultaneously. Thus, if a signal were received at a higher power level than the others, then that signal's receiver has a higher signal-to-noise ratio and therefore a lower bit error rate. The base station ensures that each mobile station transmits at the correct power level by telling the remote, every 500 microseconds, whether to increase or to decrease the mobile station's power.

Figure 8:
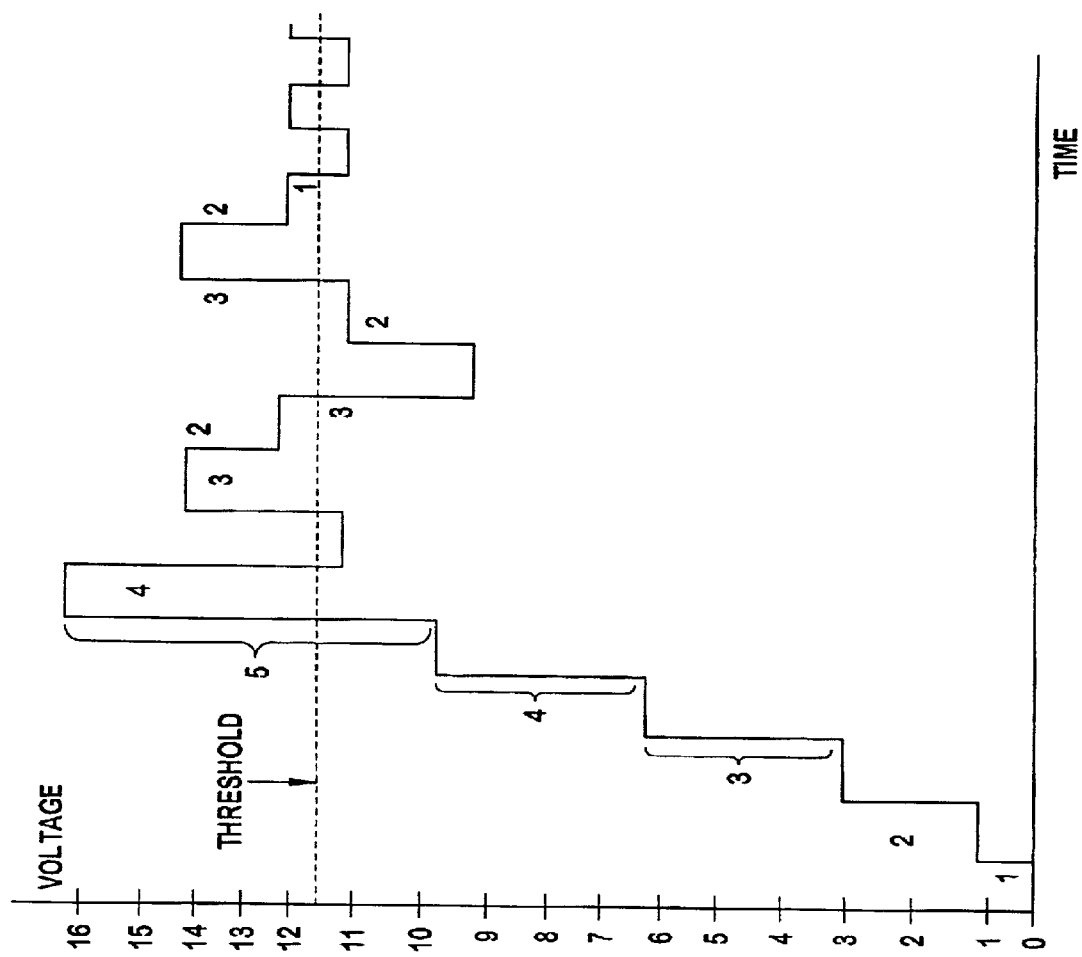
FIG. 8 illustrates nonlinear power adjustment.
Figure 11:
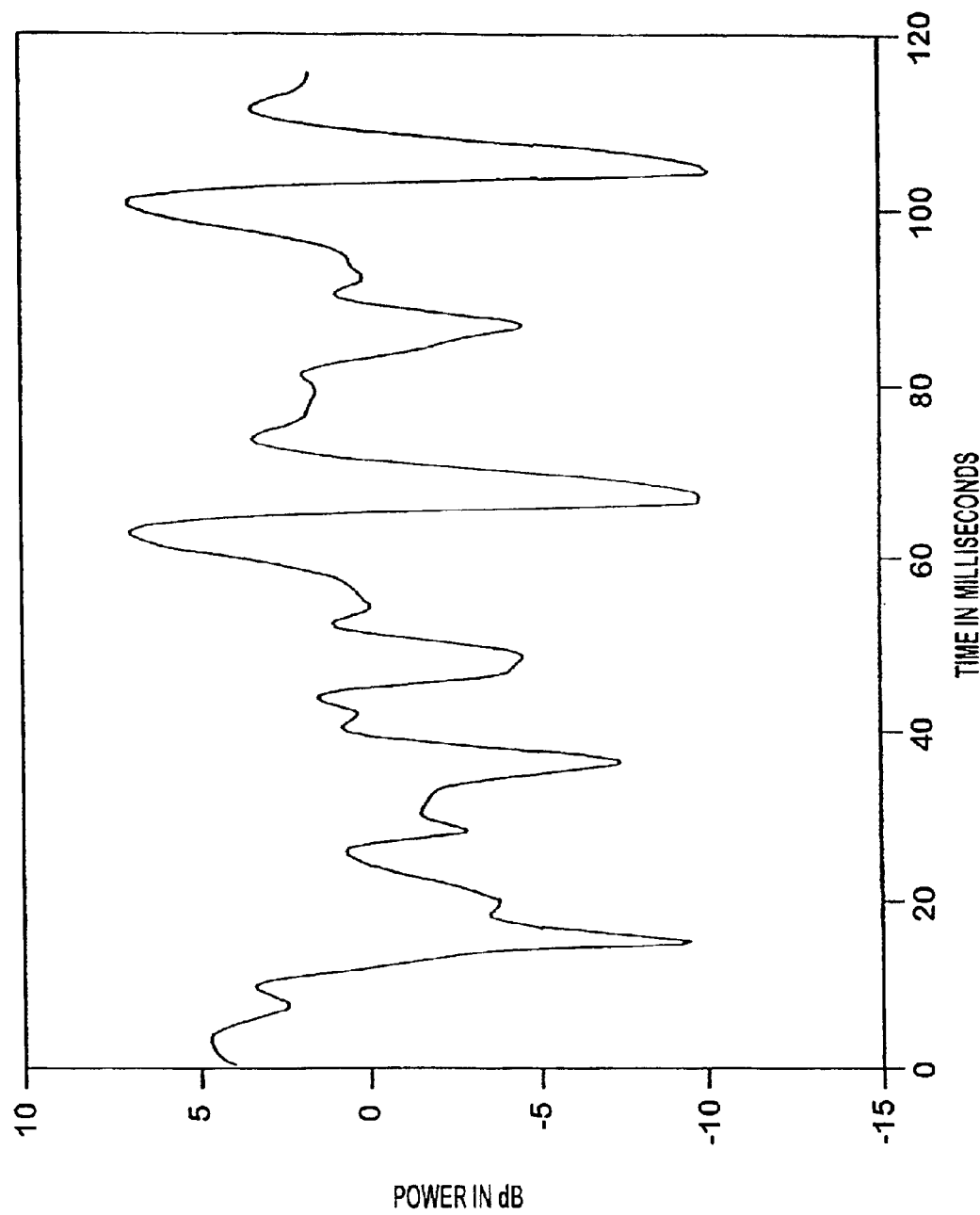
FIG. 11 illustrates during transmission time.
Figure 12:
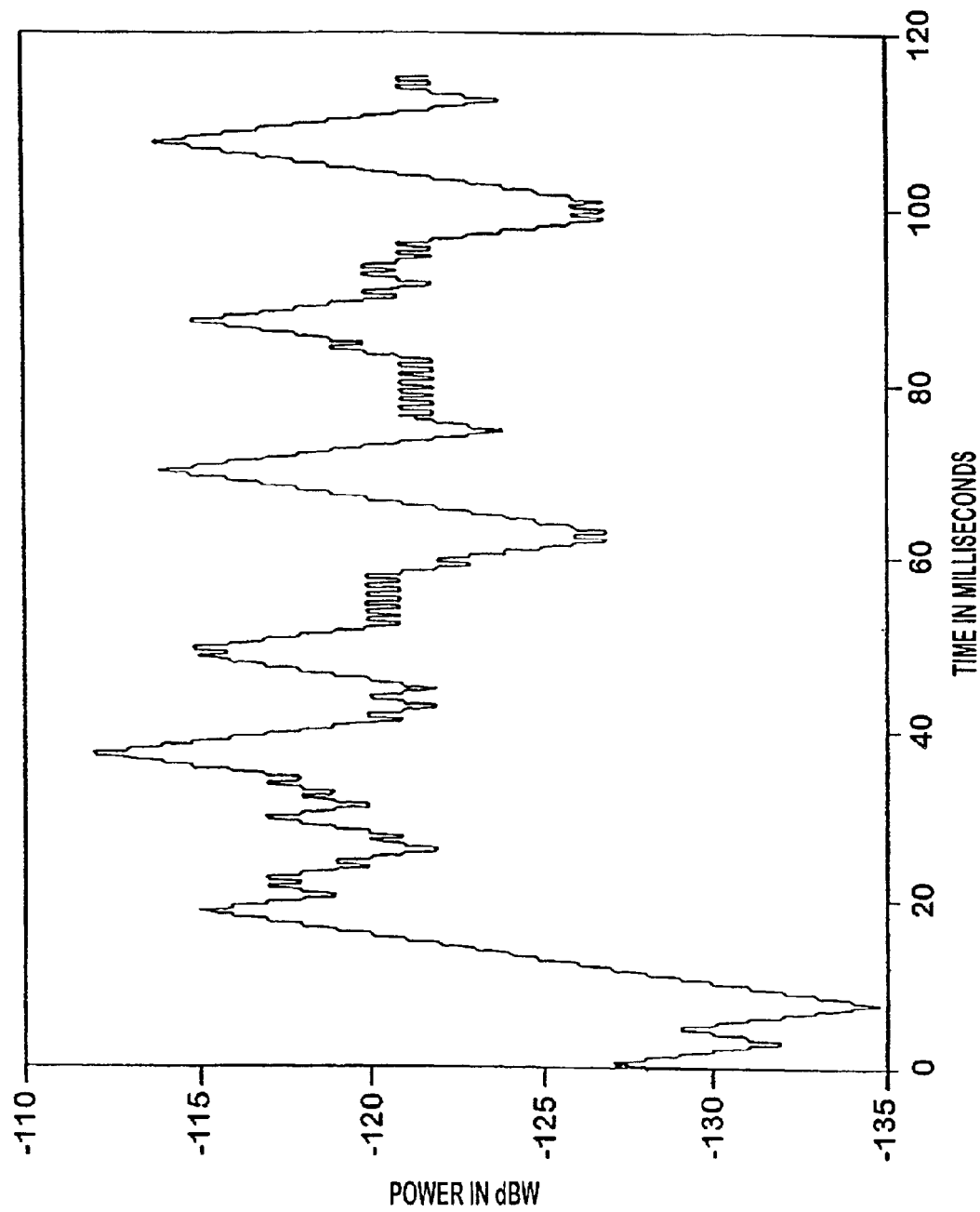
FIGS. 12 and 13 illustrate adaptive power control signal, the broadcast power, for fixed step algorithm.
Figure 13:
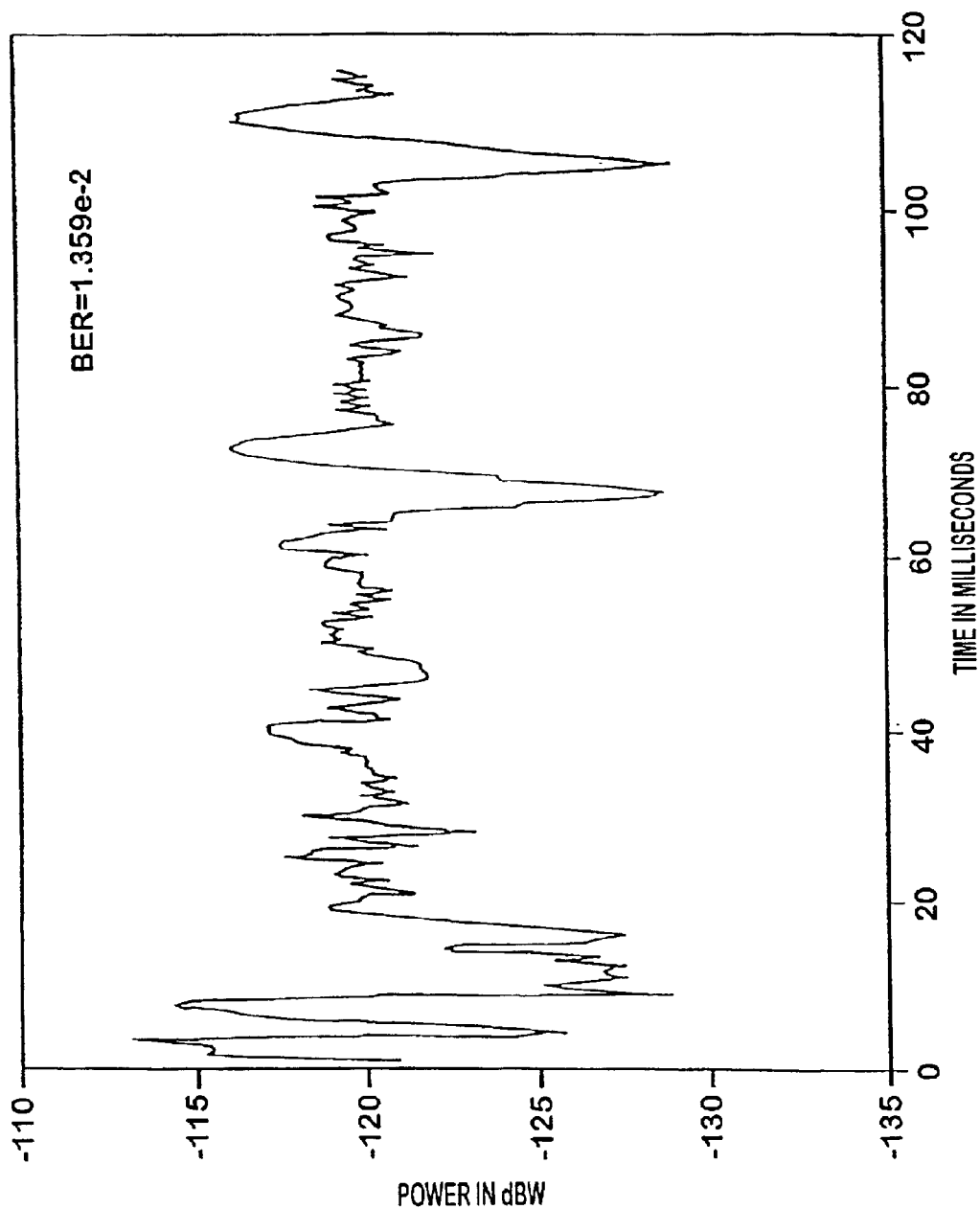

FIG. 11 shows a typical fading signal which is received at the base station along with ten other independently fading signals and thermal noise having the same power as one of the signals. Note that the fade duration is about 5 milliseconds which corresponds to vehicular speed exceeding 60 miles per hour. FIGS. 12–13 illustrate the results obtained when using a particular adaptive power control algorithm. In this case, whenever the received signal changes power, the base station informs the remote and the remote varies its power by ±1 dB. FIG. 8 shows the adaptive power control signal at the remote station. FIG. 9 shows the received power at the base station. Note that the adaptive power control track the deep fades and as a result a 9 dB fades resulted. This reduced power level resulted in a bit error rate of $1.4 \times 10^{-2}$.

Figure 14:
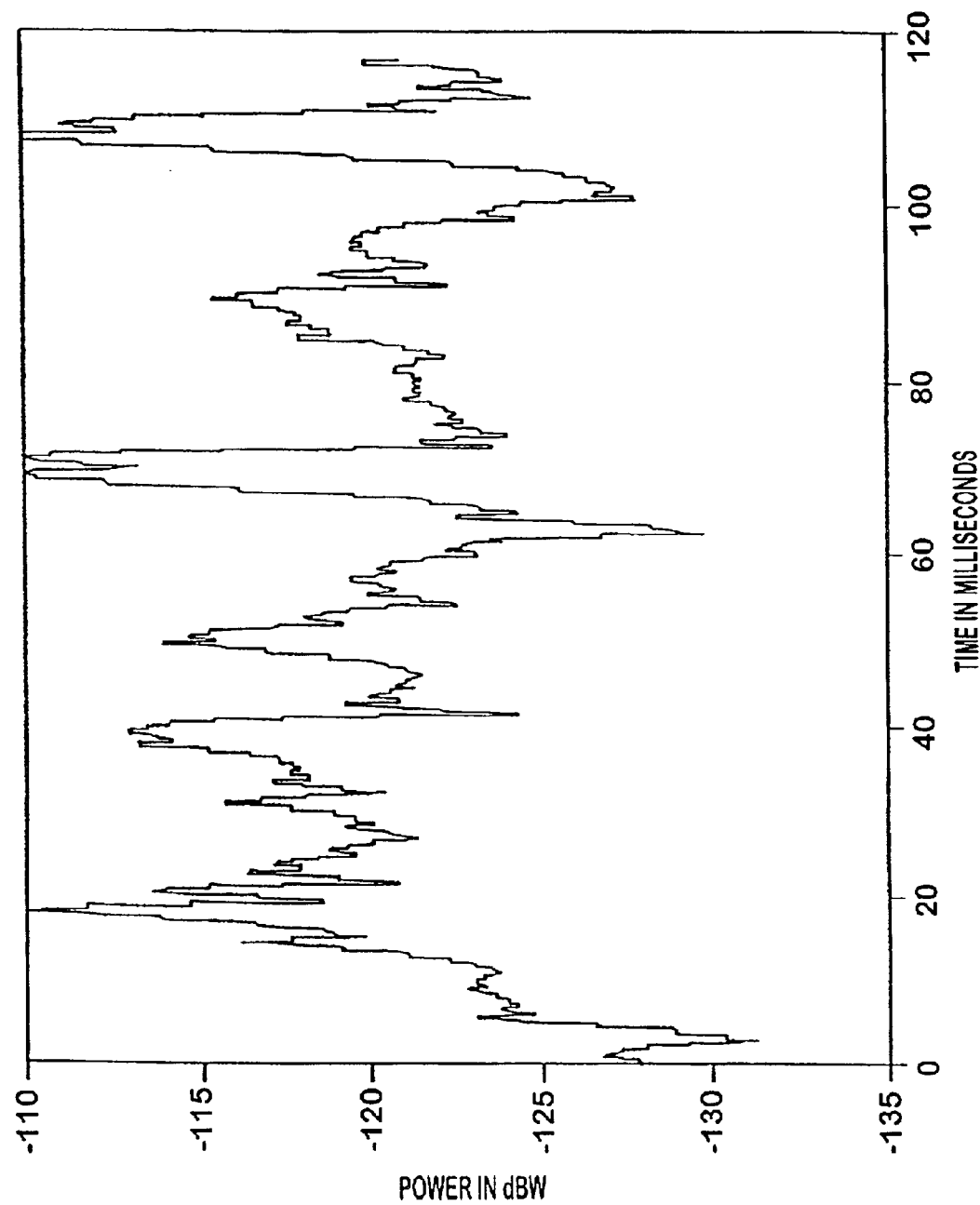
FIGS. 14 and 15 illustrate adaptive power control signal, the broadcast signal, for variable step algorithm.
Figure 15:
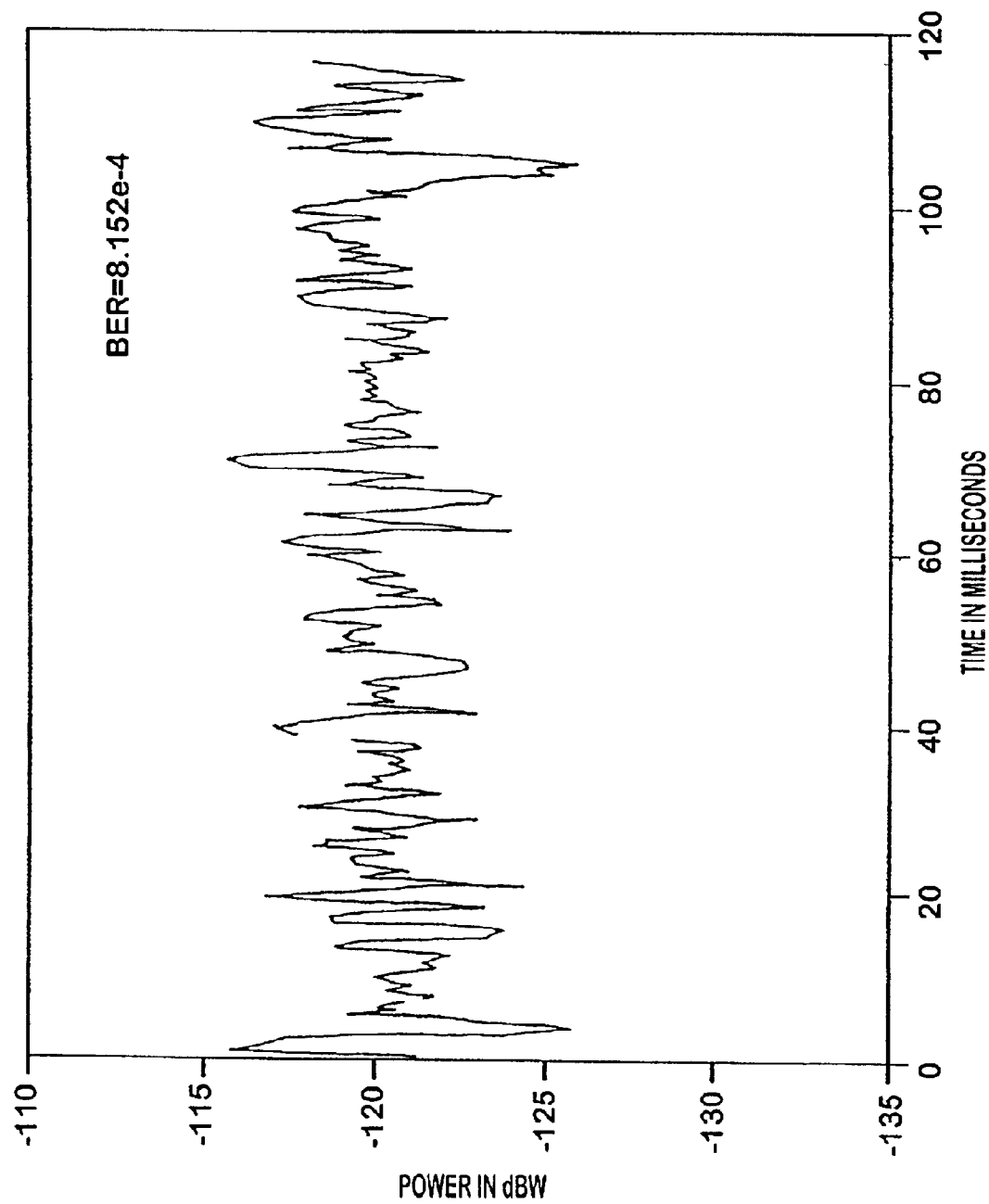

For the same fade of FIG. 11, assume a different adaptive power control algorithm is employed. In this case the control voltage results in the remote unit changing its power by a factor of 1.5 in the same direction, or by a factor of 0.5 in the opposite direction. In this particular implementation the minimum step size was 0.25 dB and the maximum step size was 4 dB. The resulting control voltage is shown in FIG. 14 and the resulting received power from the remote unit is shown in FIG. 15. Note that the error is usually limited to ±2 dB with occasional decreases in power by 5 dB to 6 dB resulting in a BER$\approx 8 \times 10^{-4}$, a significant improvement compared to the previous algorithm. The use of interleaving and forward error correcting codes usually can correct any errors resulting from the rarely observed power dips.

It will be apparent to those skilled in the art that various modifications can be made to the method and apparatus for adaptively controlling a power level of a spread-spectrum signal in a cellular environment of the instant invention without departing from the scope or spirit of the invention, and it is intended that the present invention cover modifications and variations of the method and apparatus for adaptively controlling a power level of a spread-spectrum signal in a cellular environment provided they come in the scope of the appended claims and their equivalents.

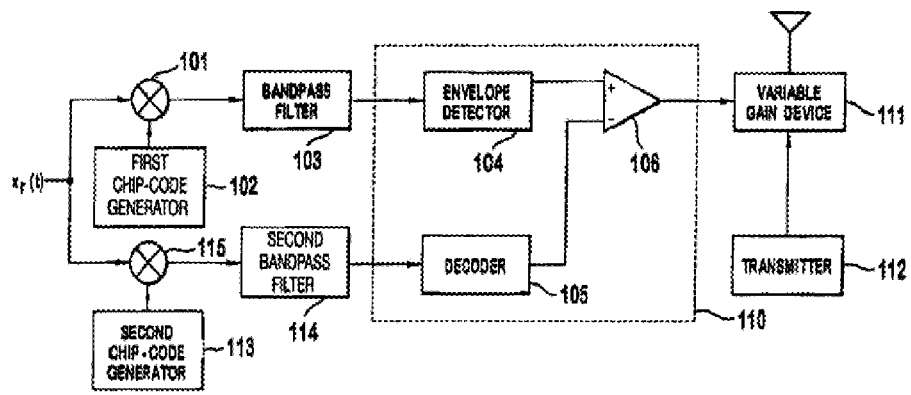

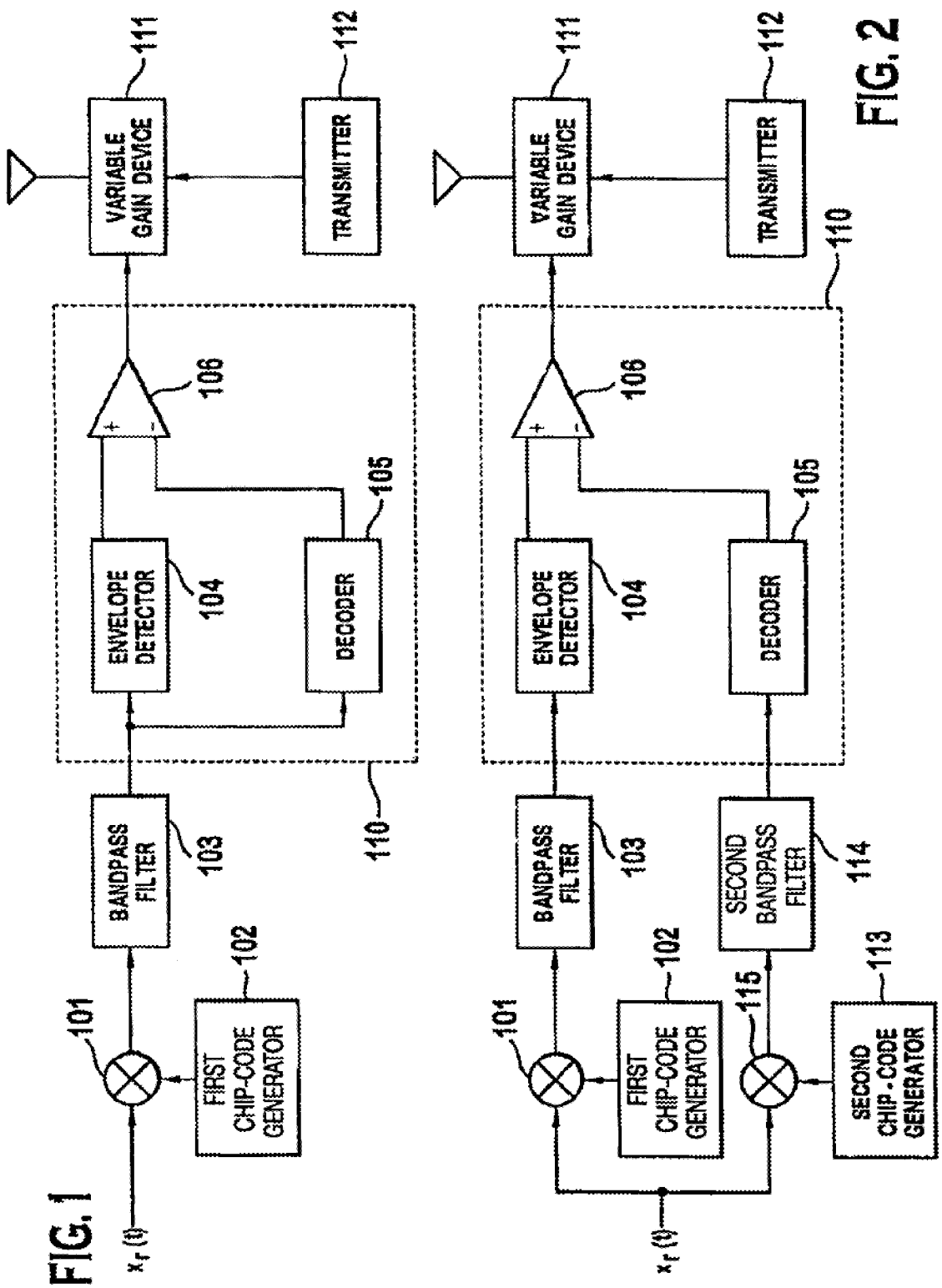

What is claimed is:

1. A method for controlling a mobile station's transmission in a spread spectrum communication system, the system having a mobile station and a base station, the method comprising:

transmitting from the base station a spread spectrum signal and a threshold;

receiving at the mobile station the spread spectrum signal and the threshold;

measuring a received power level of the received spread spectrum signal;

comparing the received power level to the threshold; and adjusting the mobile station's transmission power level based on in part a result of the comparison.

2. The method of claim 1 wherein the step of adjusting comprises if the received power level exceeds the threshold, decreasing the mobile station's transmission power level and if the received power level is less than the threshold, increasing the mobile station's transmission power level.

3. The method of claim 1 wherein the threshold is a word comprising a plurality of bits.

4. The method of claim 1 wherein the threshold is transmitted in a same channel as the spread spectrum signal.

5. The method of claim 1 wherein the threshold is transmitted in a different channel than the spread spectrum signal.

6. A method for controlling a first station's transmitter's power level in a spread spectrum communication system, the system having a first station and a second station, the method comprising:

transmitting from the second station a spread spectrum signal and a threshold;

receiving at the first station the spread spectrum signal and the threshold;

measuring a received power level of the received spread spectrum signal;

comparing the received power level to the threshold; and adjusting the first station's transmission power level based on in part a result of the comparison.

7. The method of claim 6 wherein the step of adjusting comprises if the received power level exceeds the threshold, decreasing the mobile station's transmission power level and if the received power level is less than the threshold, increasing the mobile station's transmission power level.

8. The method of claim 6 wherein the threshold is a word comprising a plurality of bits.

9. The method of claim 6 wherein the threshold is transmitted in a same channel as the spread spectrum signal.

10. The method of claim 6 wherein the threshold is transmitted in a different channel than the spread spectrum signal.

11. A spread spectrum communication system comprising:

a base station comprising:
a transmitter for transmitting a spread spectrum signal having an associated chip code and a threshold;

a mobile station comprising:
a chip code generator for generating a replica of the associated chip code;
a mixer for mixing the replica chip code with a received signal as a despread signal;
an envelop detector for determining a power level of the despread signal;
a decoder for producing a threshold value from a received threshold;
a differential amplifier comparing the despread signal power level to the threshold value; and
a variable gain device for controlling the mobile station power level in response to an output of the differential amplifier.

12. The system of claim 11 further comprising a bandpass filter for filtering the despread signal.

13. The system of claim 11 wherein the variable gain device decreases the mobile station transmission power level, if the received power level exceeds the threshold value and increases the mobile station's transmission power level, if the received power level is below the threshold value.

14. The system of claim 11 wherein the received threshold is a word comprising a plurality of bits.

15. The system of claim 11 wherein the received threshold is transmitted in a same channel as the spread spectrum signal.

16. The system of claim 11 wherein the threshold is transmitted in a different channel than the spread spectrum signal.

17. A mobile station having its transmission power level controlled in a spread spectrum communication system, the system having a base station transmitting a spread spectrum signal having an associated chip code and a threshold, the mobile station comprising:

a chip code generator for generating a replica of the associated chip code;

a mixer for mixing the replica chip code with a received signal as a despread signal;

an envelop detector for determining a power level of the despread signal;

a decoder for producing a threshold value from a received threshold;

a differential amplifier comparing the despread signal power level to the threshold value; and a variable gain device for controlling the mobile station power level in response to an output of the differential amplifier.

18. The mobile station of claim 17 further comprising a bandpass filter for filtering the despread signal.

19. The mobile station of claim 17 wherein the variable gain device decreases the mobile station's transmission power level, if the received power level exceeds the threshold value and increases the mobile station's transmission power level, if the received power level is below the threshold value.

20. The mobile station of claim 17 wherein the received threshold is a word comprising a plurality of bits.

* * * * *

UNITED STATES PATENT AND TRADEMARK OFFICE
CERTIFICATE OF CORRECTION

PATENT NO.        : 6,873,643 B2
APPLICATION NO. : 09/843520
DATED             : March 29, 2005
INVENTOR(S)      : Donald L. Schilling It is certified that error appears in the above-identified patent and that said Letters Patent is hereby corrected as shown below:

At Item (56), page 1, right column, Foreign Patent Documents, line 8, delete "EP 0392079 10/1990".

At Item (56), page 1, right column, Foreign Patent Documents, line 14, delete "WO 9107037 5/1991".

At Item (56), page 1, right column, Foreign Patent Documents, line 16, delete "WO 9115071 10/1991".

At Item (56), page 2, right column, Other Publications, line 53, after the words "and Porter, P.T.,", delete "AAdvanced" and insert therefor --"Advanced--.

At Item (56), page 2, right column, Other Publications, line 54, after the words "Service: Control", delete "Architecture@" and insert therefor --Architecture"--.

At Item (56), page 2, right column, Other Publications, line 56, after the words "Robert A.,", delete "The" and insert therefor --"The--.

At Item (56), page 2, right column, Other Publications, line 57, before the words ",IEEE Transactions", delete "munications@," and insert therefor --munications",--

At Item (56), page 3, left column, Other Publications, line 1, after the words "Blasbalg, H.,", delete "A" and insert therefor --"A--.

UNITED STATES PATENT AND TRADEMARK OFFICE
CERTIFICATE OF CORRECTION

PATENT NO. : 6,873,643 B2
APPLICATION NO. : 09/843520
DATED : March 29, 2005
INVENTOR(S) : Donald L. Schilling It is certified that error appears in the above-identified patent and that said Letters Patent is hereby corrected as shown below:

At Item (56), page 3, left column, Other Publications, line 3, before the words "IBM Journal", delete "cations,@" and insert therefor --cations",--

At Item (56), page 3, left column, Other Publications, line 5, after the words "Salmasi; et al.,", delete "On" and insert therefor --"On--.

At Item (56), page 3, left column, Other Publications, line 7, after the word "Communication", delete "Networks" and insert therefor --Networks",--.

At Item (56), page 3, right column, Other Publications, line 1, after the words "M.B. Pursley,", delete "Performance" and insert therefor --"Performance--.

At Item (56), page 3, right column, Other Publications, line 3, after the word "System", delete "Analysis@" and insert therefor --Analysis"--.

At Item (56), page 3, right column, Other Publications, line 5, after the words "J.M. Holtzman,", delete "A" and insert therefor --"A--.

At Item (56), page 3, right column, Other Publications, line 6, after the word "Error", delete "Probabilities@" and insert therefor --Probabilities"--.

At Item (56), page 3, right column, Other Publications, line 9, after the words "R.F.,", delete "Power" and insert therefor --"Power--.

UNITED STATES PATENT AND TRADEMARK OFFICE
CERTIFICATE OF CORRECTION

PATENT NO. : 6,873,643 B2
APPLICATION NO. : 09/843520
DATED : March 29, 2005
INVENTOR(S) : Donald L. Schilling It is certified that error appears in the above-identified patent and that said Letters Patent is hereby corrected as shown below:

At Item (56), page 3, right column, Other Publications, line 10, delete "Systems,@" and insert therefor --Systems",--.

At column 1, line 25, before the word "in", delete "nal" and insert therefor --nals--.

At column 3, line 15, after the word "larger", delete "a".

At column 4, line 37, after the word "can", delete "adjusts" and insert therefor --adjust--.

At column 4, line 63, after the word "generator", delete "202" and insert therefor --113--.

At column 4, line 63, after the word "device", delete "201" and insert therefor --115--.

At column 6, line 66, after the words "from the", delete "kit" and insert therefor --$k^{th}$--.

At column 8, line 3, after the word "circuit", delete "61" and insert therefor --261--.

UNITED STATES PATENT AND TRADEMARK OFFICE
CERTIFICATE OF CORRECTION

| | | |
|---|---|---|
| PATENT NO. | : 6,873,643 B2 | Page 4 of 5 |
| APPLICATION NO. | : 09/843520 | |
| DATED | : March 29, 2005 | |
| INVENTOR(S) | : Donald L. Schilling | |

It is certified that error appears in the above-identified patent and that said Letters Patent is hereby corrected as shown below:

At column 11, line 15, after the word "9 dB", delete "fades" and insert therefor --fade--.

IN THE DRAWINGS

Please replace Figures 1 and 2 with replacement Figures 1 and 2 attached hereto.

Signed and Sealed this

Fifth Day of February, 2008

JON W. DUDAS
*Director of the United States Patent and Trademark Office*

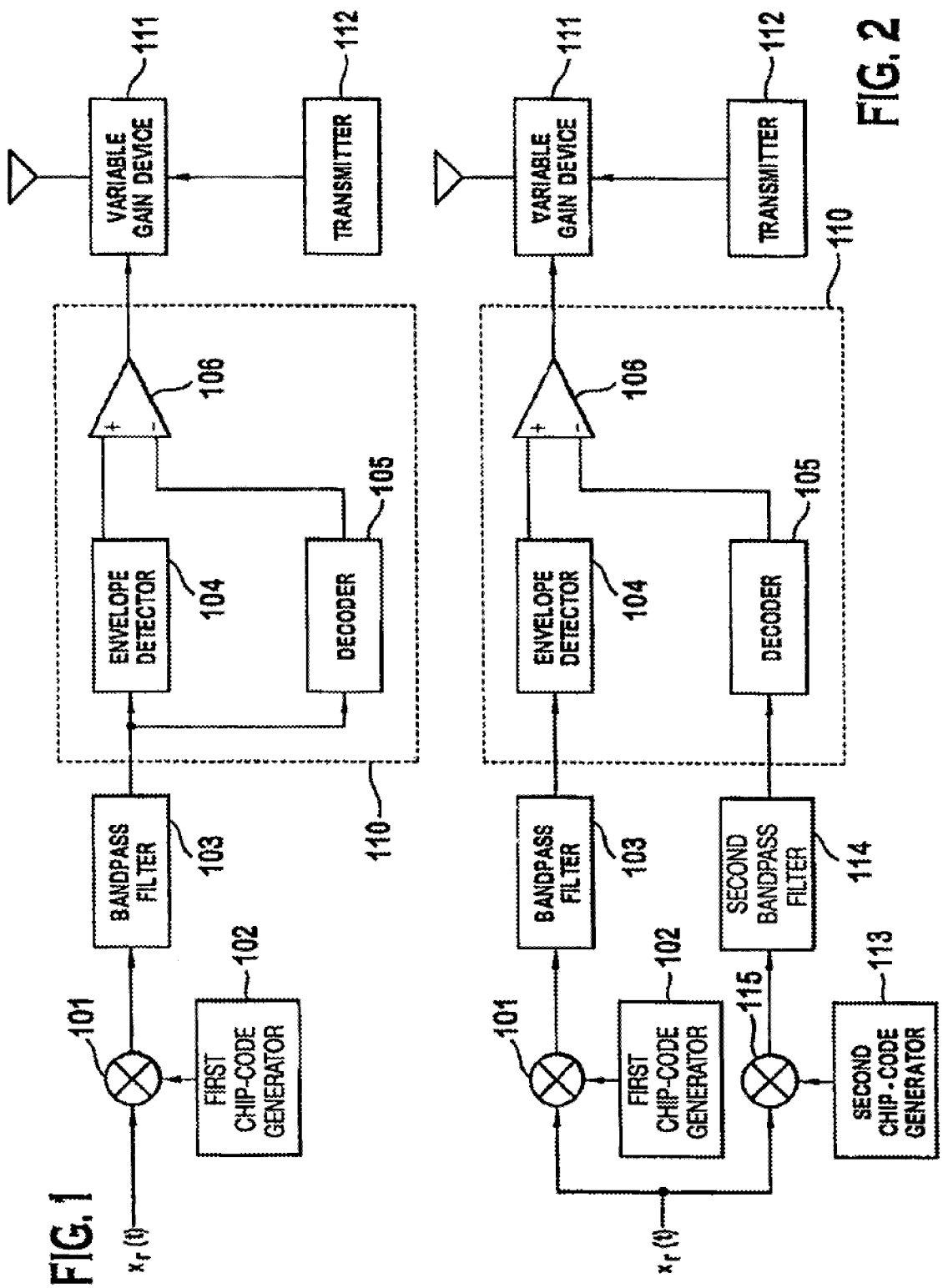

UNITED STATES PATENT AND TRADEMARK OFFICE
CERTIFICATE OF CORRECTION

| | |
|---|---|
| PATENT NO. | : 6,873,643 B2 |
| APPLICATION NO. | : 09/843520 |
| DATED | : March 29, 2005 |
| INVENTOR(S) | : Donald L. Schilling |

It is certified that error appears in the above-identified patent and that said Letters Patent is hereby corrected as shown below:

At Item (56), page 1, right column, Foreign Patent Documents, line 8, delete "EP 0392079 10/1990".

At Item (56), page 1, right column, Foreign Patent Documents, line 14, delete "WO 9107037 5/1991".

At Item (56), page 1, right column, Foreign Patent Documents, line 16, delete "WO 9115071 10/1991".

At Item (56), page 2, right column, Other Publications, line 53, after the words "and Porter, P.T.,", delete "AAdvanced" and insert therefor --"Advanced--.

At Item (56), page 2, right column, Other Publications, line 54, after the words "Service: Control", delete "Architecture@" and insert therefor --Architecture"--.

At Item (56), page 2, right column, Other Publications, line 56, after the words "Robert A.,", delete "The" and insert therefor --"The--.

At Item (56), page 2, right column, Other Publications, line 57, before the words ",IEEE Transactions", delete "munications@," and insert therefor --munications",--

At Item (56), page 3, left column, Other Publications, line 1, after the words "Blasbalg, H.,", delete "A" and insert therefor --"A--.

UNITED STATES PATENT AND TRADEMARK OFFICE
CERTIFICATE OF CORRECTION

PATENT NO. : 6,873,643 B2
APPLICATION NO. : 09/843520
DATED : March 29, 2005
INVENTOR(S) : Donald L. Schilling It is certified that error appears in the above-identified patent and that said Letters Patent is hereby corrected as shown below:

At Item (56), page 3, left column, Other Publications, line 3, before the words "IBM Journal", delete "cations,@" and insert therefor --cations",--

At Item (56), page 3, left column, Other Publications, line 5, after the words "Salmasi; et al.,", delete "On" and insert therefor --"On--.

At Item (56), page 3, left column, Other Publications, line 7, after the word "Communication", delete "Networks" and insert therefor --Networks",--.

At Item (56), page 3, right column, Other Publications, line 1, after the words "M.B. Pursley,", delete "Performance" and insert therefor --"Performance--.

At Item (56), page 3, right column, Other Publications, line 3, after the word "System", delete "Analysis@" and insert therefor --Analysis"--.

At Item (56), page 3, right column, Other Publications, line 5, after the words "J.M. Holtzman,", delete "A" and insert therefor --"A--.

At Item (56), page 3, right column, Other Publications, line 6, after the word "Error", delete "Probabilities@" and insert therefor --Probabilities"--.

At Item (56), page 3, right column, Other Publications, line 9, after the words "R.F.,", delete "Power" and insert therefor --"Power--.

UNITED STATES PATENT AND TRADEMARK OFFICE
CERTIFICATE OF CORRECTION

PATENT NO. : 6,873,643 B2
APPLICATION NO. : 09/843520
DATED : March 29, 2005
INVENTOR(S) : Donald L. Schilling It is certified that error appears in the above-identified patent and that said Letters Patent is hereby corrected as shown below:

At Item (56), page 3, right column, Other Publications, line 10, delete "Systems,@" and insert therefor --Systems",--.

At column 1, line 25, before the word "in", delete "nal" and insert therefor --nals--.

At column 3, line 15, after the word "larger", delete "a".

At column 4, line 37, after the word "can", delete "adjusts" and insert therefor --adjust--.

At column 4, line 63, after the word "generator", delete "202" and insert therefor --113--.

At column 4, line 63, after the word "device", delete "201" and insert therefor --115--.

At column 6, line 66, after the words "from the", delete "kit" and insert therefor --$k^{th}$--.

At column 8, line 3, after the word "circuit", delete "61" and insert therefor --261--.

UNITED STATES PATENT AND TRADEMARK OFFICE
CERTIFICATE OF CORRECTION

PATENT NO. : 6,873,643 B2
APPLICATION NO. : 09/843520
DATED : March 29, 2005
INVENTOR(S) : Donald L. Schilling It is certified that error appears in the above-identified patent and that said Letters Patent is hereby corrected as shown below:

At column 11, line 15, after the word "9 dB", delete "fades" and insert therefor --fade--.

IN THE DRAWINGS

Please replace Figures 1 and 2 with replacement Figures 1 and 2 attached hereto.

Signed and Sealed this

Twenty-sixth Day of February, 2008

JON W. DUDAS
*Director of the United States Patent and Trademark Office*

(12) United States Patent
Schilling

(10) Patent No.: US 6,873,643 B2
(45) Date of Patent: *Mar. 29, 2005

(54) SPREAD SPECTRUM ADAPTIVE POWER CONTROL COMMUNICATIONS SYSTEM AND METHOD

(75) Inventor: Donald L. Schilling, Sands Point, NY (US)

(73) Assignee: InterDigital Technology Corporation, Wilmington, DE (US)

(*) Notice: Subject to any disclaimer, the term of this patent is extended or adjusted under 35 U.S.C. 154(b) by 728 days.

This patent is subject to a terminal disclaimer.

(21) Appl. No.: 09/843,520

(22) Filed: Apr. 27, 2001

(65) Prior Publication Data

US 2002/0012382 A1 Jan. 31, 2002

(Under 37 CFR 1.47)

Related U.S. Application Data

(63) Continuation-in-part of application No. 09/167,388, filed on Oct. 6, 1998, now Pat. No. 6,226,316, which is a continuation of application No. 08/666,069, filed on Jun. 21, 1996, now abandoned, which is a continuation of application No. 08/218,198, filed on Mar. 28, 1994, now Pat. No. 5,535,238, which is a continuation-in-part of application No. 07/792,869, filed on Nov. 19, 1991, now Pat. No. 5,299,226, which is a continuation-in-part of application No. 07/614,816, filed on Nov. 16, 1990, now Pat. No. 5,093,840.

(51) Int. Cl.$^7$ .................................................. H04B 1/69
(52) U.S. Cl. ...................... 375/130; 375/141; 455/522
(58) Field of Search ................................. 375/130, 142, 375/138, 141, 146; 455/13.4, 522

(56) References Cited

U.S. PATENT DOCUMENTS

| | | |
|---|---|---|
| 3,831,013 A | 8/1974 | Alsup et al. |
| 3,838,342 A | 9/1974 | Bjorkman |
| 3,900,721 A | 8/1975 | Speiser et al. |

(Continued)

FOREIGN PATENT DOCUMENTS

| | | |
|---|---|---|
| EP | 0265178 | 4/1988 |
| EP | 0392079 | 10/1990 |
| EP | 0392079 A2 | 10/1990 |
| GB | 2229609 | 9/1990 |
| WO | 8600486 | 1/1986 |
| WO | WO 86/00486 | 1/1991 |
| WO | WO 91/07037 | 5/1991 |
| WO | 9107037 | 5/1991 |
| WO | WO 91/15071 | 10/1991 |
| WO | 9115071 | 10/1991 |

OTHER PUBLICATIONS

Fluhr, Z.C. and Porter, P.T., "Advanced Mobile Phone Service: Control Architecture", The Bell system Technical Journal (Jan. 1979), vol. 58, No. 1, pp. 43–69.

(Continued)

*Primary Examiner*—Temesghen Ghebretinsae
(74) *Attorney, Agent, or Firm*—Volpe and Koenig, P.C.

(57) ABSTRACT

A spread spectrum communication system has a mobile station and a base station. The base station transmits a spread spectrum signal and a threshold. The mobile station receives the spread spectrum signal and the threshold. A received power level of the received spread spectrum signal is measured. The received power level is compared to the threshold. The mobile station's transmission level is adjusted based on in part a result of the comparison.

20 Claims, 14 Drawing Sheets